United States Patent
Kamal et al.

(10) Patent No.: US 9,939,004 B2
(45) Date of Patent: Apr. 10, 2018

(54) COATED FASTENERS WITH CONFORMING SEALS

(71) Applicant: Arconic Inc., Pittsburgh, PA (US)

(72) Inventors: Manish Kamal, Seal Beach, CA (US); Luke Haylock, Culver City, CA (US); Hasim Mulazimoglu, La Habra, CA (US); Andreas Liebscher, San Diego, CA (US); Gregory Rizza, Westminster, CA (US); Rodrigo Pinheiro, Riverside, CA (US); Wudhidham Prachumsri, Torrance, CA (US)

(73) Assignee: ARCONIC INC, Pittsburgh, PA (US)

( * ) Notice: Subject to any disclaimer, the term of this patent is extended or adjusted under 35 U.S.C. 154(b) by 6 days.

(21) Appl. No.: 15/059,608

(22) Filed: Mar. 3, 2016

(65) Prior Publication Data

US 2016/0281760 A1 Sep. 29, 2016

Related U.S. Application Data

(63) Continuation-in-part of application No. 14/854,223, filed on Sep. 15, 2015, now Pat. No. 9,638,236.
(Continued)

(51) Int. Cl.
*F16B 43/00* (2006.01)
*F16B 33/00* (2006.01)
(Continued)

(52) U.S. Cl.
CPC ............ *F16B 33/008* (2013.01); *B64D 45/02* (2013.01); *F16B 33/06* (2013.01); *F16B 35/06* (2013.01);
(Continued)

(58) Field of Classification Search
CPC ...... F16B 33/004; F16B 33/008; F16B 33/06; F16B 35/06; F16B 39/225; F16B 43/001; F16B 2019/045; F16B 43/00
(Continued)

(56) References Cited

U.S. PATENT DOCUMENTS

| | | | |
|---|---|---|---|
| 1,868,415 A | * | 7/1932 | Gundersen ............. B23G 9/001 29/416 |
| 2,396,661 A | | 3/1946 | Keller et al. |

(Continued)

FOREIGN PATENT DOCUMENTS

| | | |
|---|---|---|
| CN | 203297273 U | 11/2013 |
| CN | 105422578 A | 3/2016 |

(Continued)

OTHER PUBLICATIONS

International Search Report and Written Opinion dated Oct. 19, 2016, issued by the European Patent Office in International Patent Application No. PCT/US2016/037610 filed Jun. 15, 2016 (12 pages).

(Continued)

*Primary Examiner* — Roberta S Delisle
(74) *Attorney, Agent, or Firm* — Greenberg Traurig, LLP

(57) ABSTRACT

A pin member for a fastener includes an elongated shank having a first end, a second end opposite the first end, a cylindrical shank portion having an outer surface, a head located at the first end of the elongated shank, the head including a bearing surface located on the bearing surface of the head, and a threaded portion located at the second end of the elongated shank. The pin member can be fully coated with a coating. A conformable seal element is attached to the pin member, which is adapted to fill the microscopic voids between the bearing surface of the head of the pin member and the surrounding structure under the axial load exerted by (Continued)

the fastener during installation. The seal element can be separate and distinct from the pin member. The seal element can be attached to the pin member for the sake of convenience, but the seal element can deform independently of the pin member and the surrounding structure in response to the forces exerted by the fastener.

35 Claims, 17 Drawing Sheets

Related U.S. Application Data

(60) Provisional application No. 62/051,602, filed on Sep. 17, 2014, provisional application No. 62/211,250, filed on Aug. 28, 2015.

(51) Int. Cl.
  *F16B 33/06*    (2006.01)
  *F16B 35/06*    (2006.01)
  *B64D 45/02*    (2006.01)
  *C23C 30/00*    (2006.01)
  *F16B 19/04*    (2006.01)

(52) U.S. Cl.
  CPC .............. *F16B 43/00* (2013.01); *C23C 30/00* (2013.01); *F16B 2019/045* (2013.01)

(58) Field of Classification Search
  USPC .............. 411/82, 82.2, 371.1, 371.2
  See application file for complete search history.

(56) References Cited

U.S. PATENT DOCUMENTS

| | | | |
|---|---|---|---|
| 2,501,567 A | 3/1950 | Huck | |
| 2,940,767 A | 6/1960 | Quayle | |
| 3,041,912 A | 7/1962 | Kreider et al. | |
| 3,215,024 A | 11/1965 | Brilmyer et al. | |
| 3,239,036 A | 3/1966 | Scott | |
| 3,271,058 A | 9/1966 | Anderson | |
| 3,304,109 A | 2/1967 | Schuster | |
| 3,464,306 A | 9/1969 | Reynolds et al. | |
| 3,535,911 A | 10/1970 | Armstrong et al. | |
| 3,606,357 A * | 9/1971 | Yonkers ................ | F16B 43/001 |
| | | | 277/637 |
| 3,788,185 A * | 1/1974 | Gutshall ................ | F16B 35/06 |
| | | | 411/369 |
| 3,792,933 A | 2/1974 | Stencel | |
| 3,820,297 A | 6/1974 | Hurd | |
| 3,835,615 A | 9/1974 | King, Jr. | |
| 3,915,052 A | 10/1975 | Ruhl | |
| 3,949,535 A | 4/1976 | King, Jr. | |
| 3,953,906 A | 5/1976 | Brown | |
| 3,965,792 A | 6/1976 | King, Jr. | |
| 4,048,898 A | 9/1977 | Salter | |
| 4,102,030 A | 7/1978 | King, Jr. | |
| 4,114,505 A * | 9/1978 | Loeser ................ | F16B 33/008 |
| | | | 205/196 |
| 4,164,807 A | 8/1979 | King, Jr. | |
| 4,164,971 A * | 8/1979 | Strand ................ | F16B 33/06 |
| | | | 156/330 |
| 4,244,661 A | 1/1981 | Dervy | |
| 4,405,256 A | 9/1983 | King, Jr. | |
| 4,472,097 A | 9/1984 | Ruhl et al. | |
| 4,479,163 A | 10/1984 | Bannink, Jr. et al. | |
| 4,502,092 A | 2/1985 | Bannink, Jr. et al. | |
| 4,557,033 A | 12/1985 | Champoux | |
| 4,628,402 A | 12/1986 | Covery | |
| 4,702,655 A | 10/1987 | Kendall | |
| 4,755,904 A | 7/1988 | Brick | |
| 4,760,493 A | 7/1988 | Pearson | |
| 4,789,283 A | 12/1988 | Crawford | |
| 4,813,834 A | 3/1989 | Smith | |
| 4,850,771 A | 7/1989 | Hurd | |
| 4,867,625 A | 9/1989 | Dixon | |
| 4,891,732 A | 1/1990 | Jones | |
| 4,905,931 A | 3/1990 | Covey | |
| 4,943,196 A | 7/1990 | Dahl | |
| 5,018,920 A | 5/1991 | Speakman | |
| 5,129,253 A | 7/1992 | Austin et al. | |
| 5,176,481 A | 1/1993 | Schiefer | |
| D372,857 S | 8/1996 | Hirai | |
| 6,149,363 A | 11/2000 | March | |
| 6,213,699 B1 | 4/2001 | Sadri et al. | |
| 6,499,926 B2 | 12/2002 | Keener | |
| 6,589,918 B2 | 7/2003 | Denpo et al. | |
| 6,659,699 B2 | 12/2003 | Stoewer et al. | |
| 6,665,922 B2 | 12/2003 | Schultz | |
| 7,038,920 B2 * | 5/2006 | Banyai ................ | F16B 33/06 |
| | | | 361/785 |
| 7,050,286 B2 | 5/2006 | Pridham et al. | |
| 7,160,630 B2 | 1/2007 | Klos | |
| 7,236,343 B2 | 6/2007 | Heidlebaugh et al. | |
| 7,277,266 B1 | 10/2007 | Le et al. | |
| 7,307,825 B2 | 12/2007 | De La Fuente De Anna et al. | |
| 7,326,015 B2 | 2/2008 | Reynolds, Jr. | |
| 7,525,785 B2 | 4/2009 | Rawlings | |
| 7,554,785 B2 | 6/2009 | Hawley | |
| 7,599,164 B2 | 10/2009 | Heeter et al. | |
| 7,695,226 B2 | 4/2010 | March et al. | |
| 7,721,990 B2 | 5/2010 | Jaeger et al. | |
| 7,738,236 B2 | 6/2010 | Stein | |
| 7,740,433 B2 * | 6/2010 | Miyoshi ................ | F16B 43/001 |
| | | | 411/371.1 |
| 7,755,876 B2 | 7/2010 | Morrill et al. | |
| 7,869,181 B2 | 1/2011 | Le | |
| 7,898,785 B2 | 3/2011 | Winter et al. | |
| 7,969,706 B2 | 6/2011 | Heeter et al. | |
| 8,312,606 B2 | 11/2012 | Reid et al. | |
| 8,506,224 B2 * | 8/2013 | Cosenza ................ | F16B 5/0208 |
| | | | 411/353 |
| 8,573,910 B2 | 11/2013 | March et al. | |
| 8,636,455 B2 | 1/2014 | Wehrmeister et al. | |
| 8,647,035 B2 | 2/2014 | Bakken et al. | |
| 9,123,998 B1 | 9/2015 | LoRe | |
| 2002/0119028 A1 | 8/2002 | Brown et al. | |
| 2004/0091331 A1 | 5/2004 | Schultz | |
| 2005/0144874 A1 | 7/2005 | West et al. | |
| 2007/0041143 A1 | 2/2007 | Georgeson et al. | |
| 2007/0111909 A1 | 5/2007 | Combetta | |
| 2007/0177330 A1 | 8/2007 | Ackerman et al. | |
| 2007/0258182 A1 | 11/2007 | Morrill et al. | |
| 2008/0075555 A1 | 3/2008 | March | |
| 2008/0240925 A1 | 10/2008 | Kita et al. | |
| 2009/0060666 A1 | 3/2009 | Georgeson et al. | |
| 2009/0159306 A1 | 6/2009 | Loche et al. | |
| 2009/0178262 A1 | 7/2009 | Reid et al. | |
| 2010/0124472 A1 | 5/2010 | Nguyen et al. | |
| 2010/0219287 A1 | 9/2010 | Sanchez-Brunete Alvarez et al. | |
| 2010/0260572 A1 | 10/2010 | Wehrmeister et al. | |
| 2010/0272537 A1 | 10/2010 | Haylock et al. | |
| 2010/0276536 A1 | 11/2010 | Lambert et al. | |
| 2010/0277849 A1 | 11/2010 | Morrill et al. | |
| 2010/0278616 A1 | 11/2010 | March | |
| 2011/0056718 A1 | 3/2011 | Gattus et al. | |
| 2013/0004261 A1 | 1/2013 | Pattinson et al. | |
| 2014/0056664 A1 | 2/2014 | March | |
| 2014/0230228 A1 | 8/2014 | Whitlock et al. | |
| 2016/0076575 A1 | 3/2016 | Kamal et al. | |

FOREIGN PATENT DOCUMENTS

| | | |
|---|---|---|
| DE | 202 10 801 U1 | 10/2002 |
| DE | 10 2010 009901 A1 | 9/2011 |
| DE | 102013000308 A1 | 7/2014 |
| EP | 3217312 A2 | 4/1987 |
| EP | 0248122 A2 | 12/1987 |
| EP | 0468563 A1 | 1/1992 |
| EP | 2 471 712 A2 | 7/2012 |
| EP | 2 615 314 A1 | 7/2013 |
| EP | 2805889 A1 | 11/2014 |
| FR | 2 165 404 A5 | 8/1973 |

(56) References Cited

FOREIGN PATENT DOCUMENTS

| GB | 2212580 A | 7/1989 |
|----|-----------|--------|
| JP | 7151111 A | 12/1996 |
| JP | 2010-133446 A | 6/2010 |
| WO | 8705976 A1 | 10/1987 |
| WO | 2009/063060 A1 | 5/2009 |

OTHER PUBLICATIONS

International Search Report and Written Opinion issued in International Patent Application No. PCT/US2010/053342 entitled "Enhanced Conductivity Sleeved Fastener and Method for Making Same" (11 pages).
International Search Report and Written Opinion issued in International Patent Application No. PCT/US07/78775, dated Oct. 22, 2008 (7 pages).
International Search Report and Written Opinion issued in International Patent Application No. PCT/US2010/029758, dated Sep. 7, 2010 (11 pages).
Notice of Opposition of European Patent Application No. 07116776, including English-language translation, filed Jan. 6, 2012.
ASTM International, "Standard Guide for Measuring and Reporting Friction Coefficients", Nov. 2008, pp. 1-12.
Huck International, Inc., Huck aerospace Fasteners for Composite Structure, copyright 1992.
"Guide d'emploi des traitements de surfaces appliques aux problemes de frollement", including its English-language translation, copyright Technique and Documentation, 2000.
Huck Manufacturing Company, "Lightweight (GP) Interference Fit Fastener for Composite Materials", Apr. 1984.
Military Specification, Lubricant, Solid Film, Heat Cured, Corrosion Inhibiting, Nato Code No. S-1738, MIL-L-8937D, Mar. 29, 2982 superseding MIL-L-8937C, Mar. 18, 1976.
Oak Ridge Laboratory, Metals and Ceramics Division, "Friction and Wear of Titanium Alloys Sliding Against Metal, Polymer, and Ceramic Counterfaces", by Jun Qu, et al., Nov. 11, 2004.
Wrocklow University of Technology, Department of Mechanical Engineering, "The Statistical Correlation of the coefficient of Friction and Wear Rate of PTFE Composites with Steel Counterface Roughness and Hardness", Wojciech Wielaba, 2002.
International Search Report and Written Opinion dated Dec. 14, 2015, issued by the European Patent Office in International (PCT) Application No. PCT/US2015/050105 (11 pages).
International Search Report and Written Opinion dated Dec. 17, 2015, issued by the European Patent Office in International (PCT) Application No. PCT/US2015/050091 (12 pages).

* cited by examiner

Baseline
Conventional Pin Member at 40X

Conventional Pin Member at 600X

Conforming Conical Seal
Pin Member with Seal Element at 25X

Pin Member with Seal Element at 1000X

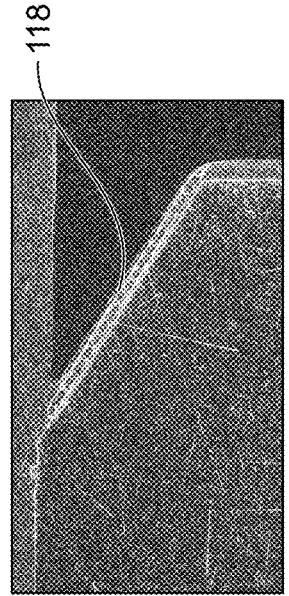
FIG. 17A Standard Fastener
FIG. 17B Fastener with Seal Element
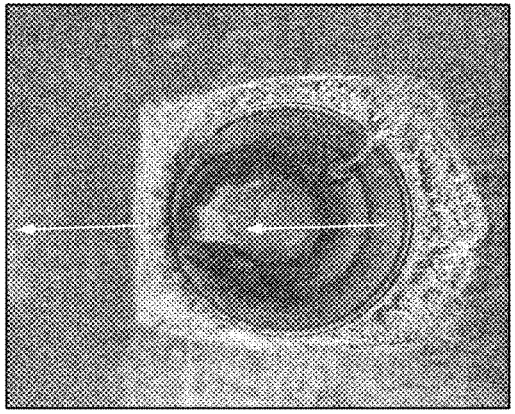
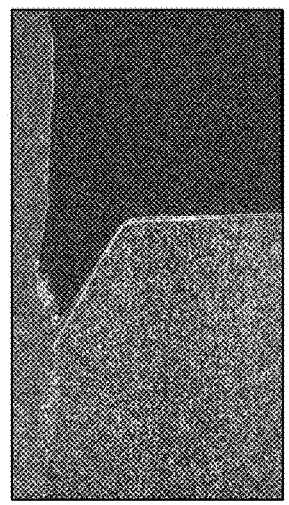
FIG. 17C Without Seal Element
FIG. 17D With Seal Element

COATED FASTENERS WITH CONFORMING SEALS

CROSS-REFERENCE TO RELATED APPLICATIONS

This application is a continuation-in-part application relating to and claiming the benefit of commonly-owned, co-pending U.S. application Ser. No. 14/854,223 entitled "FASTENERS WITH COATED AND TEXTURED FIN MEMBERS," filed Sep. 15, 2016, which claims the benefit of commonly-owned, U.S. Provisional Patent Application Ser. No. 62/051,602, entitled "FASTENERS WITH COATED AND TEXTURED PIN MEMBERS," filed Sep. 17, 2014, the entireties of which are incorporated herein by reference. The present application also claims the benefit of commonly-owned, U.S. Provisional Patent Application Ser. No. 62/211,250 entitled "CONFORMING CONICAL SEAL FOR FASTENERS," filed Aug. 28, 2015, the entirety of which is incorporated herein by reference.

FIELD OF THE INVENTION

The present invention relates to fasteners and, more particularly, to fasteners having coated pin members and conforming conical seals.

BACKGROUND OF THE INVENTION

Continuous fiber reinforced composites are extensively used in both primary and secondary aircraft components for a variety of applications where light weight, higher strength and corrosion resistance are primary concerns. Composites are typically composed of fine carbon fibers that are oriented at certain directions and surrounded in a supportive polymer matrix. Since the plies of the composite material are arranged at a variety of angles, and depending upon the direction of major loading, the resultant structure is typically a stacked laminated structure, which is highly anisotropic and heterogeneous. A significant portion of the composite structure is fabricated as near net-shape, but is drilled in order to facilitate joining of components using mechanical fasteners. Drilling fastener holes in composite does not compare to the uniformity of aluminum or steel since individual carbon fibers fracture at irregular angles and form microscopic voids between the fastener and the hole. As the cutting tool wears down, there is an increase of surface chipping and an increase in the amount of uncut fibers OF resin and delamination. The composite microstructure containing such defects is referred to as "machining-induced micro texture."

In addition to their machining challenges, composite structures in aircrafts are more susceptible to lightning damage compared to metallic structures. Metallic materials, such as aluminum, are very conductive and are able to dissipate the high currents resulting from a lightning strike. Carbon fibers are 100 times more resistive than aluminum to the flow of current. Similarly epoxy, which is often used as a matrix in conjunction with carbon fibers, is 1 million times more resistive than aluminum. The composite structural sections of an aircraft often behave like anisotropic electrical conductors. Consequently, lightning protection of a composite structure is more complex, due to the intrinsic high resistance of carbon fibers and epoxy, the multi-layer construction, and the anisotropic nature of the structure. Some estimates indicate that, on average, each commercial aircraft in service is struck by lightning at least once per year.

Aircraft flying in and around thunderstorms are often subjected to direct lightning strikes as well as to nearby lightning strikes, which may produce corona and streamer formations on the aircraft. In such cases, the lightning discharge typically originates at the aircraft and extends outward from the aircraft. While the discharge is occurring, the point of attachment moves from the nose of the aircraft and into the various panels that compromise the skin of the aircraft. The discharge usually leaves the aircraft structure through the empennage.

The protection of aircraft fuel systems against fuel vapor ignition due to lightning is even more critical. Since commercial aircraft contain relatively large amounts of fuel and also include very sensitive electronic equipment they are required to comply with a specific set of requirements related to the lightning strike protection in order to be certified for operation. It is a well-known fact that fasteners are often the primary pathways for the conduction of the lightning currents from skin of the aircraft to supporting structures such as spars or ribs, and poor electrical contact between the fastener body and the parts of the structure can lead to detrimental fastener arcing or sparking.

To avoid the potential for ignition at the fastener/composite structure interface, some aircraft use fasteners which are in intimate contact with the fastener hole. Intimate contact between bare metallic fasteners and the hole in the composite structure has been known to be the best condition for electrical current dissipation. One approach to achieve fastener-to-composite hole intimacy is to use a sleeved fastener. This approach involves first inserting a close fitting sleeve in the hole. An interference-fit pin is then pulled into the sleeve. This expands the sleeve to bring it m contact with the wall of the hole in the composite structure. Although the sleeve substantially reduces the gap between the fastener and composite structure, it cannot eliminate the small gaps created due to the presence of drilling induced texture across the composite inner-hole surface. This machining induced texture also entraps excess sealant, an insulating material, inhibiting the intimate contact between the sleeve and the hole. This situation becomes even worse as the cutting tool wears, resulting in more and larger machining induced defects.

In order to avoid this condition, the current must dissipate through the carbon fibers exposed along the inner surface of the fastener hole, if the fastener is not in intimate contact with the inside of the hole, the instantaneous joule energy driven by the lightning strike leads to plasma formation within the gap that leads to air/metal vapor ionization which leads to pressure buildup that blows out in the form of a spark or hot particle ejection. The intrinsic high conductivity of metallic fasteners and the large number of fasteners used in aircraft construction combine to create a condition of a high probability of lightning attachment to fasteners.

SUMMARY OF THE INVENTION

In an embodiment, a fastener comprising a pin member including an elongated shank having a first end, a second end opposite the first end, a cylindrical shank portion having an outer surface, a head located at the first end of the elongated shank, the head including a bearing surface located on the underside of the Head, and a threaded portion located at the second end of the elongated shank; and a seal element attached to the pin member and juxtaposed with the bearing surface of the head of the pin member. In an embodiment, the seal element is made of copper. In an embodiment, the seal element includes a sealing portion having a first side and a second side opposite the first side, a lip extending from the first side of the sealing portion. In an embodiment, the lip extends angularly from the sealing portion. In an embodiment, the seal element includes a tubular portion extending axially from the side of the sealing portion. In an embodiment, the seal element includes a thickness in a range of about 5 microns to about 100 microns. In an embodiment, the pin member includes a coating. In an embodiment, the coating is a metallic coating, in an embodiment, the metallic coating is selected from the group consisting of gold, silver, and copper. In an embodiment, the coating is made from a material having an electrical conductivity higher than 20% IACS.

In an embodiment, the head of the pin member is coated with the coating, in an embodiment, the outer surface of the cylindrical shank portion of the pin member is coated with the coating. In an embodiment, the head of the pin member and the cylindrical shank portion of the pin member are coated with the coating. In an embodiment, the threaded portion of the pin member and the cylindrical shank portion of the pin member are coated with the coating. In an embodiment, the pin member is fully coated with the coating.

In an embodiment, in combination, a structure; and a fastener installed within the structure, the fastener including a pin member having an elongated shank with a first end, a second end opposite the first end, a cylindrical shank portion having an outer surface, a bead located at the first end of the elongated shank, the head including a bearing surface located on the underside of the head, and a threaded portion located at the second end of the elongated shank, and a seal element attached to the pin member and juxtaposed with the bearing surface of the head of the pin member. In an embodiment, the structure includes a composite material. In an embodiment, the structure is substantially made from the composite material. In an embodiment, the structure is partially made from the composite material. In an embodiment, the structure includes a metallic material. In an embodiment, the metallic material is aluminum. In an embodiment, the structure is made substantially from the metallic material. In an embodiment, the structure is made partially from the metallic material.

In an embodiment, a method of making a fastener, comprising the steps of: providing a pin member including an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank; and attaching a seal element to the pin member in a position that is juxtaposed with the bearing surface of the head of the pin member. In an embodiment, the method includes the step of coating at least a portion of the pin member with a coating. In an embodiment, the coating is a metallic coating. In an embodiment, the metallic coating is selected from the group consisting of gold, silver, and copper. In an embodiment, the coating is made from a material having an electrical conductivity higher than 20% IACS. In an embodiment, the coating step includes coating the head of the pin member with the coating. In an embodiment, the coating step includes coating the outer surface of the cylindrical shank portion with the coating. In an embodiment, the coating step includes coating the head of the pin member and the cylindrical shank portion with the coating. In an embodiment, the coating step includes coating the threaded portion and the cylindrical shank portion of the pin member with the coating. In an embodiment, the coating step includes coating the pin member fully with the coating.

In an embodiment, a method of installing a fastener into a structure, comprising the steps of: providing a fastener having a pin member including an elongated shank having a first end, a second end opposite the first end, a cylindrical shank portion having an outer surface, a head located at the first end of the elongated shank, the head including a bearing surface boated on the underside of the head, and a threaded portion located at the second end of the elongated shank and a seal element adapted to be positioned on the pin member such that the seal member is juxtaposed with the bearing surface of the head of the pin member; and installing the fastener into the structure in an installed position. In an embodiment, the method includes the step of coating at least a portion of the pin member with a coating. In an embodiment, the coating is a metallic coating. In an embodiment, the metallic coating is selected from the group consisting of gold, silver, and copper. In an embodiment, the coating is made from a material having an electrical conductivity higher than 20% IACS. In an embodiment, the coating step includes coating the head of the pin member with the coating, in an embodiment, the coating step includes coating the outer surface of the cylindrical shank portion with the coating. In an embodiment, the coating step includes coating the head and the cylindrical shank portion of the pin member with the coating. In an embodiment, the coating step includes coating the cylindrical shank portion and the threaded portion of the pin member with the coating. In an embodiment, the coating step includes coating the pin member fully with the coating. In an embodiment, the structure includes a composite material. In an embodiment, the structure is substantially made from the composite material. In an embodiment, the structure is partially made from the composite material. In an embodiment, the structure includes a metallic material. In an embodiment, the metallic material is aluminum. In an embodiment, the structure is made substantially from the metallic material. In an embodiment, the structure is made partially from the metallic material. In an embodiment, the method further comprises the step of trimming the seal element flush with the structure. In an embodiment, the trimming step includes sanding the seal element in an embodiment, the method further comprises the step of providing a metallic mesh on an outer surface of the structure, wherein when the fastener is in its installed position, the sealing element of the fastener is in direct physical and electrical contact with the metallic mesh. In an embodiment, the seal element includes a sealing portion having a first side and a second side opposite the first side, a lip extending from the first side of the sealing portion, the lip being in direct physical and electrical contact with the metallic mesh. In an embodiment, the metallic mesh is made from copper.

BRIEF DESCRIPTION OF THE DRAWINGS

FIG. 12A is a micro-photograph that illustrates a standard fastener installed in a structure, while

FIG. 15A is a micro-photograph of a standard fastener installed in a structure with an associated copper mesh, while

FIGS. 16A and 16B are micro-photographs of a conventional fastener installed in a structure (40 times and 800 times magnification, respectively), while

FIG. 17A is a photograph showing the effects of lightning damage on a standard fastener installed in a structure, while FIG. 17B is a photograph showing the effects of lightning damage on a fastener as shown in FIG. 8 installed in a structure;

FIG. 17C is a micro-photograph showing the effects of lightning damage on a standard fastener installed in a structure, while FIG. 7D is a micro-photograph showing the effects of lightning damage on a fastener as shown in FIG. 8 installed in a structure;

DETAILED DESCRIPTION OF THE DRAWINGS

Figure 1:
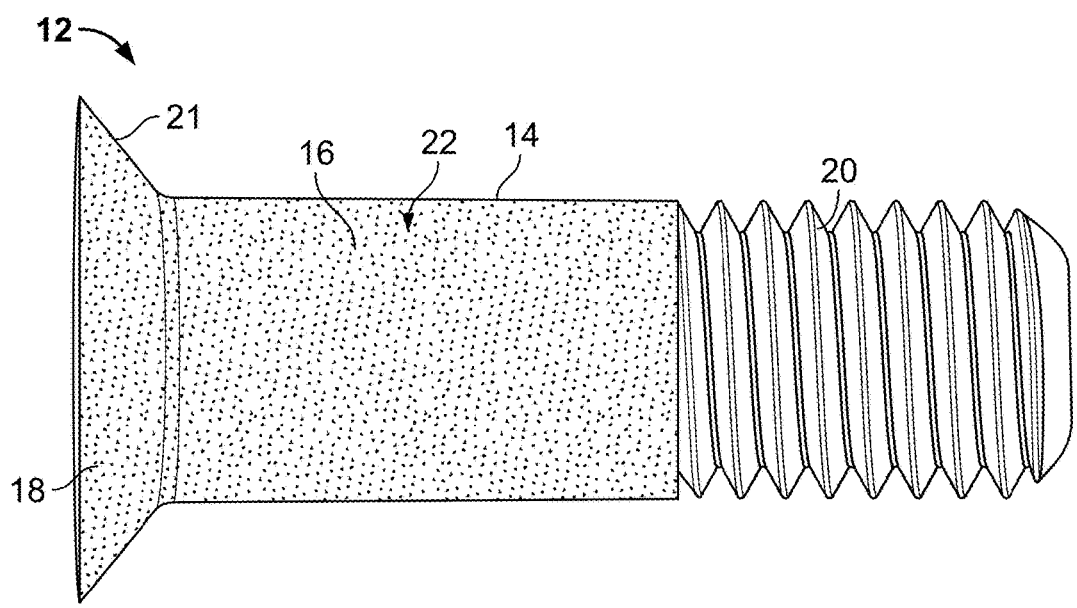
FIG. 1 is a side elevational view of an embodiment of a pin member having selected surfaces coated with a material.

Referring to FIG. 1, in an embodiment, a pin member 12 includes an elongated shank 14 having a cylindrical shank portion 16, a head 18 at one end of the cylindrical shank portion 16 and a threaded portion 20 at an opposite end of the cylindrical shank portion 16. In an embodiment, the head 18 is a countersunk head. In an embodiment, the outer surfaces of the head 18, including an underside surface (e.g., bearing surface) 21 of the head 18, and the cylindrical shank portion 16 are coated with costing 22. In an embodiment, the coating 22 is tungsten. In another embodiment, the coating 22 is molybdenum. In another embodiment, the coating 22 is a refractory metal, such as tantalum or niobium. In another embodiment, the coating 22 is a refractory ceramic, such as alumina ($Al_2O_3$), silica ($SiO_2$) or other metal oxides, in another embodiment, only the outer surfaces of the head 18 are coated with the coating 22. In another embodiment, only the outer surface of the cylindrical shank portion 16 is coated with the coating 22. In an embodiment, the coating 22 lowers electrical contact resistance and reduces probability of arc initiation/damage. In an embodiment, the coating 22 includes a high electrical conductivity (higher than 20% IACS) and be galvanically compatible to a structure (e.g., anodic index less than 1.0V) for corrosion resistance. In an embodiment, the structure includes a composite structure. In another embodiment, the structure includes a metal structure. In another embodiment, the structure includes a fiber metal laminate structure.

In an embodiment, the coating 22 is a thin film coating having a thickness in a range of about one (1) nanometer to about two-hundred (200) microns. In an embodiment, the coating 22 is applied by physical vapor deposition. In another embodiment, the coating 22 is applied by chemical vapor deposition. In another embodiment, the coating 22 is applied by a selective additive process. In another embodiment, the coating 22 is applied by electroplating, in another embodiment, the coating 22 is applied by a spraying process. In another embodiment, the coating 22 is applied by cold spraying. In another embodiment, the coating 22 is applied by thermal spraying. In another embodiment, the coating 22 is applied by plasma coating. In another embodiment, the coating 22 is applied by a sputter deposition process.

In another embodiment, the outer surfaces of the head 18 and the cylindrical shank portion 16 are textured. In an embodiment, the outer surfaces of the head 18 and the cylindrical shank portion 16 of the pin member 12 are textured to conform to the machine-induced micro texture inherent in fastener holes drilled in composite structures, and to provide mechanical interlocking between the pin member 12 and the composite structure. In an embodiment, the textured pin member 12 excavates excess entrapped sealant during installation of the fastener while bringing the fastener in intimate contact with the structure, and, thus, lowering the electrical contact resistance at the interface. The term "intimate contact" as used herein means that the textured outer surface of the pin member 12 is deformed into ail or substantially all of voids between the pin member and the composite structure, in another embodiment, only the outer surfaces of the head 18 are textured. In another embodiment, only the outer surface of the cylindrical shank portion 16 is textured.

In an embodiment, the textured surfaces of the pin member 12 are created by surface reshaping processes, such as media blasting. In an embodiment, the textured surfaces of the pin member 12 are grit blasted. In an embodiment, the grit blasting utilizes fine grit glass bead media (100-170 mesh). In an embodiment, the grit blasting is performed until there is full coverage of the outer surfaces of the pin member 12 to be textured. In an embodiment, the grit blasting is performed for at least one minute. In another embodiment, the grit blasting is performed for about one minute. In an embodiment, the grit blasting step is performed twice. In another embodiment, the textured surfaces of the pin member 12 are coated by removal processes, such as selective electro-etching, laser etching, abrasive blasting, and mechanical polishing. In another embodiment, the textured surfaces of the pin member 12 are created by chemical etching. In an embodiment, the chemical etching utilizes 50/50 hydrochloric acid (HCl). In an embodiment, the chemical etching is performed for about 30 minutes, in an embodiment, the pin member 12 is rinsed with distilled water for about 15-20 seconds, and dried with forced, room-temperature air for approximately 1 to 2 minutes.

In another embodiment, the surfaces of the head 18 and the cylindrical shank portion 16 of the pin member 12 are coated and textured by a combination of a coating process and a texturing process as described above. In an embodiment, a combination of the coating and texturing processes can be used to develop functional characteristics of the pin member 12, based on a specific loading pattern thereof. For example, in an embodiment, where the preload is high, the texturing/coating is performed to lower contact resistance. At locations which carry no preload and are not in intimate contact with the composite layer, mitigation of plasma generation and arc formation/damage is desired.

Figure 2:
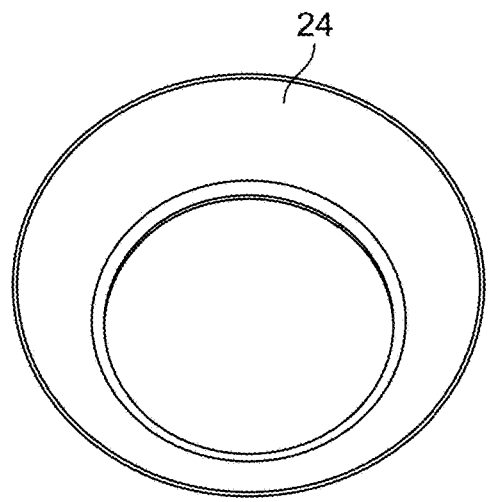
FIG. 2 is a bottom perspective view of an embodiment of a seal.
Figure 3:
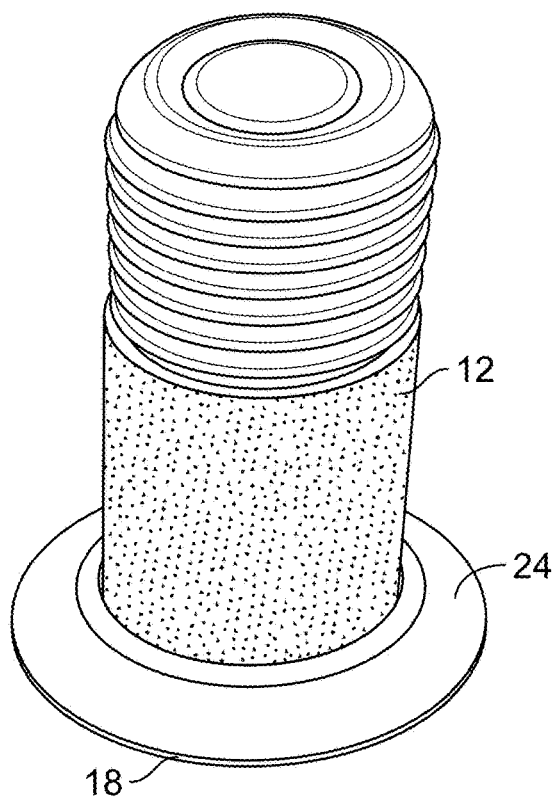
FIG. 3 is a bottom perspective view of the pin member and the seal shown in FIGS. 1 and 2, respectively, assembled together.

In an embodiment, the pin member 12 is part of a fastener that is adapted to secure a plurality of work pieces of to one another, and is adapted to be installed within aligned holes in such work pieces. In an embodiment, the work pieces are made of a composite material. In another embodiment, the work pieces are made of metal. In another embodiment, the work pieces are made from a fiber metal laminate. In an embodiment, the fastener includes a locking member (not shown in the Figures). In an embodiment, the locking member is a nut. In another embodiment the locking member is a collar. In an embodiment, a fastener 10 includes the pin member 12 and a seal 24 installed on the bearing surface 21 of the head 18 of the pin member 12, as shown in FIGS. 2 and 3, and to be discussed in further detail below.

During a lightning strike on an aircraft, the lightning typically attaches to the head 18 of the pin member 12 first, in an embodiment, the coated and/or textured pin member 12 improves contact resistance. In this regard, all solid surfaces are rough on a micro-scale and contact between two engineering bodies occurs at discrete spots produced by the mechanical contact of asperities on the two surfaces. For all solid materials, the true area of contact is a small fraction of the apparent contact area. Electrical current lines get increasingly distorted as the contact spot is approached and flow lines bundle together to pass through "a-spots". An electrical junction consists of a number of contact "a-spots" through which electrical current passes from one connector component to the other and is often characterized by electrical contact resistance of the interface.

When a fastener is installed in a composite structure using a clearance fit, the primary load bearing surface of the pin member 12 as installed is the bearing surface 21 of the head 18. This is an electrical contact through which it is desired to pass a high frequency, high voltage current and is a significant, first line of defense to the lightning strike. If the current has a path to flow easily, no arcing and resultant damage would occur. The pin or bolt to composite interface can prove to be an inefficient electrical contact due to dissimilar materials, presence of electrically insulating films like aircraft sealant and/or hard oxide layers on the surface and irregular cut pattern of the composite. To allow current to flow easily through the pin/bolt to composite interface, the interface contact resistance is desired to be low.

Contact resistance is highly dependent on the applied load on both the surfaces that brings them in contact and electrical and mechanical properties of the material surface in contact. A soft material at the interface with high electrical conductivity lowers the contact resistance, as do higher loads. The load in a pin member joint is provided by the preload and is primarily geometry/design dependent. As described above, the material coating 22 or texturing on the bearing surface 21 of the head 18 is used to both provide a low resistivity material at the contact interface and a soft conforming layer for better contact with the structure. Soft materials with high electrical conductivity, such as copper, gold, silver or other metals/materials can be used to lower contact resistance (see, e.g., the copper seal 24 shown in FIGS. 2 and 3).

The surfaces of the pin member 12, as described above, can also be textured to enable better intimacy with the surrounding composite layer. As the textured pin member 12 is installed, the textured pin member deforms into the small voids that are created during drilling of the composite layer. As the textured surfaces deform into the voids, they displace the entrapped sealant during fastener installation. The insertion of the pin member 12 causes the excess sealant to be extruded outside the pin member 12/composite interface. Thus, the textured pin member 12 excavates excess entrapped sealant during installation of the fastener while bringing the pin member 12 in intimate contact with the composite structure. The finish texture of the pin member's 12 surfaces is adjusted to provide a surface micro-roughness (Sa) value in order to increase the level of conformity and mechanical interlocking. In an embodiment, the surface roughness (Sa) is greater than 0.5 micron.

As described above, FIG. 1 shows an embodiment of a tungsten coated pin member 12. In an embodiment, plasma coating was used to deposit tungsten on the pin member 12 and achieve a surface roughness (Sa) equal or greater than 7 micron. FIG. 2 shows the seal 24 and FIG. 3 shows the pin member 12 with the seal 24 installed on it to promote intimacy with the composite layer on the bearing surface 21 of the head 18. In an embodiment, the seal 24 is frusto-conical in shape, and is sized and shaped to fit on the bearing surface 21 of the head 18. In another embodiment, this can also be achieved by copper coating the bearing surface 21 of the head 18. In another embodiment, the seal 24 is a captive washer. In another embodiment, the seal 24 is coated with a coating, in an embodiment, the coating of the seal 24 includes the coating 22.

Figure 4:
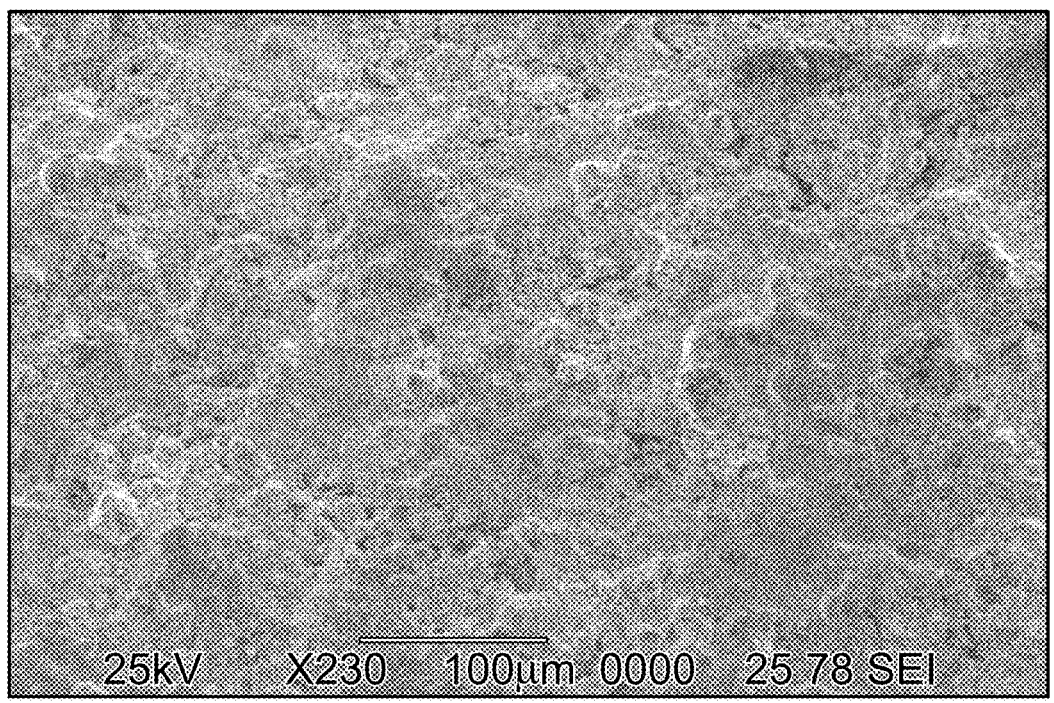
FIG. 4 is a photograph of an embodiment of an outer surface of the coated pin member shown in FIG. 1.
Figure 5:
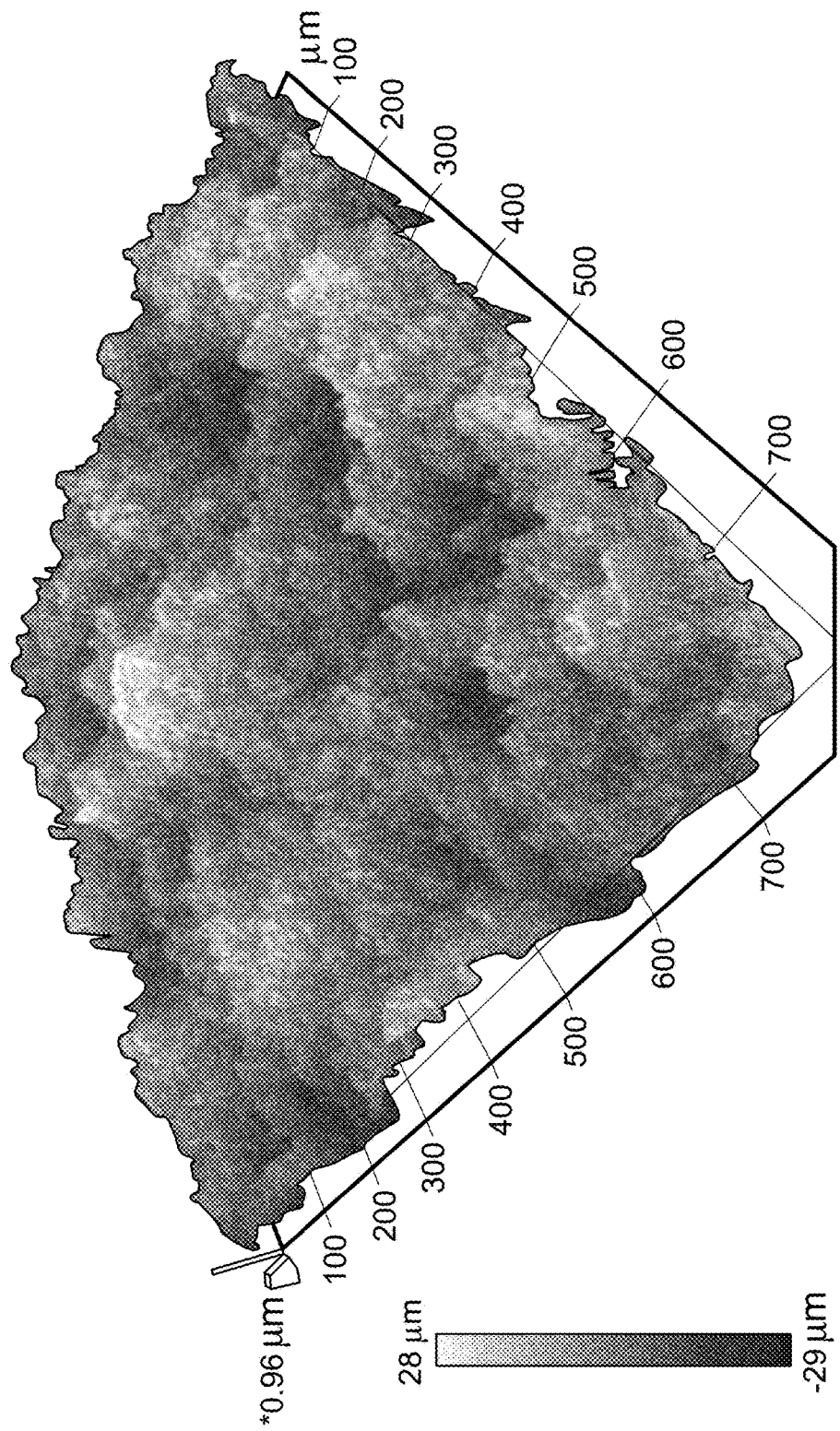
FIG. 5 is a photograph of the topography of an outer surface of an embodiment of the coated pin member shown in FIG. 1.
Figure 6:
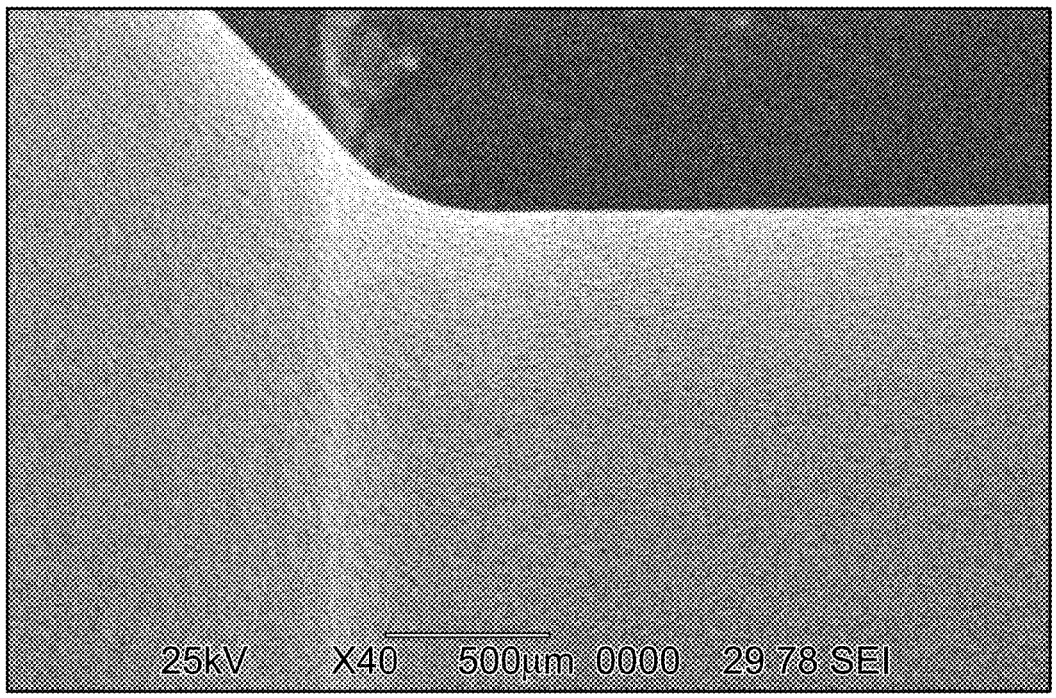
FIGS. 6 and 7 are photographs of an embodiment of a pin member having a textured surface.
Figure 7:
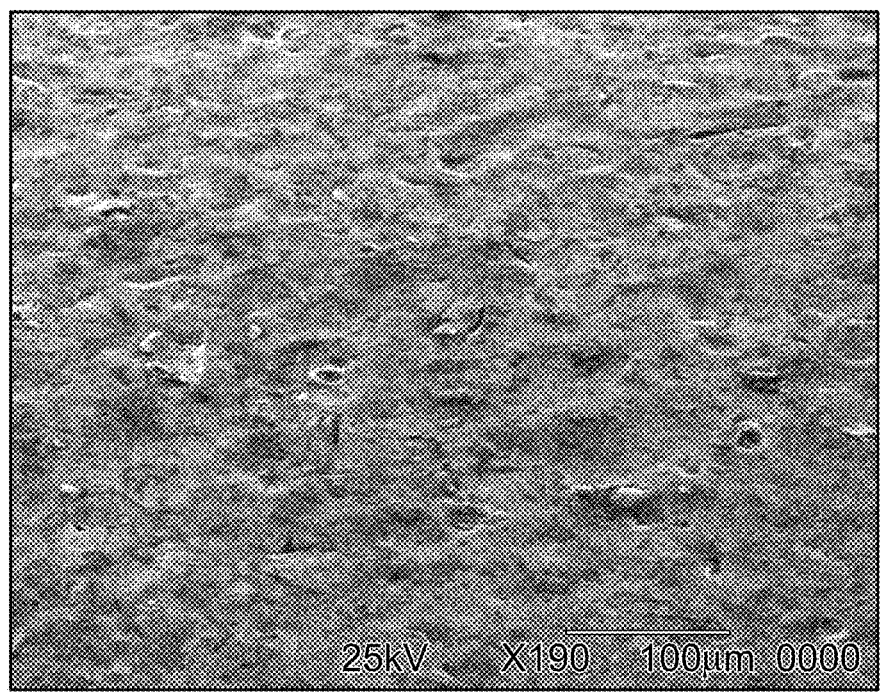

FIG. 4 shows a photograph of the texture variation of the coated pin member 12, while FIG. 5 shows the surface topography of the coated pin member 12. In an embodiment, the coated surfaces of the pin member 12 have an average surface roughness (Sa) of 7.5 micron. FIGS. 6 and 7 are photographs of the textured pin member 12 at 40× and 190× magnification, respectively. As can be seen in FIGS. 6 and 7, the textured pin member 12 exhibits a substantially rough finish. In an embodiment, the textured pin member 12 provides improved electrical contact along the textured surfaces of the pin member 12, which minimizes the dielectric effect caused by the sealant, promotes easier transfer of electric current, reduces the voltage potential across the pin member 12/composite interface, and thus enables transfer of electric current without any breakdown effects like arcing.

In an embodiment, in a clearance fit hole, there is no preload between the shank 14 of the pin member 12 and the composite layer, and thus electrical contact is relatively poor. Thus, it would be difficult to ensure significant current flow between the pin member 12 and the composite layer. In case sufficient currents are not conducted by the bearing surface 21 of the head 18, there would be a possibility of arcing at the gap between the shank 14 and the adjacent composite layers. Arc formation under such conditions typically initiates in the metal vapor itself. The presence of a high temperature melting material with high conductivity will ensure that sufficient metal vapor is not present to initiate arcing. Even if arcing is initiated, the volume of plasma will be low. Higher conductivity will also ensure that current is more easily passed between the shank 14 and composite layer if contact is available. As described above, in certain embodiments, materials like tungsten, molybdenum, or refractory metals/ceramics can be used as the coating 22 on the shank 14 of the pin member 12 to ensure reduction in arc damage. Since lightning strikes generate high frequency currents, current would typically flow close to the fastener surface due to "skin effect". The coating on the pin member 12 also helps in this respect that a higher temperature melting point and high conductivity material would carry most of the current lowering the likelihood of fastener melting or plasma generation.

Thus, the coated/textured pin member 12:
Improves electrical contact between composite and fastener surface;
Minimizes fastener arcing during lightning strikes;
Provides gap filling and mechanical interlocking capabilities;
Reduces likelihood of plasma formation during arcing around the fastener shank;
In case arcing occurs in the fastener, reduces the volume of plasma generated to make it easier to be contained.

Coated Fasteners with Conforming Conical Seals

Figure 8:
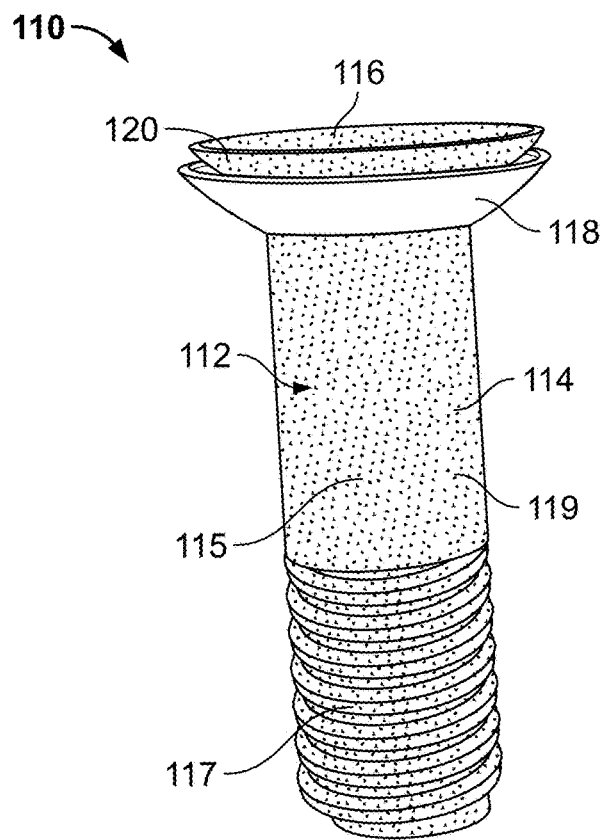
FIG. 8 is a side elevational view of an embodiment of a pin member having a conforming seal element.
Figure 9A:
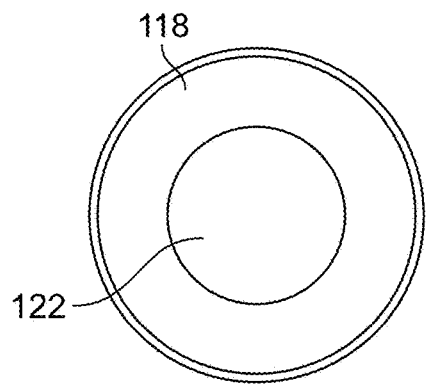
FIGS. 9A and 9B are top plan and side views, respectively, of an embodiment of a conforming seal element.
Figure 9B:
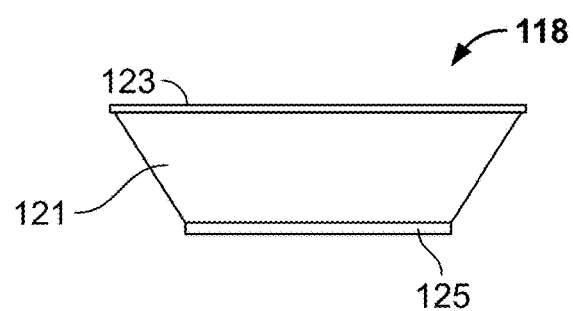

Referring to FIGS. 8, 9A and 9B, in an embodiment, a fastener 110 includes a pin member 112 having an elongated shank portion 114 with a smooth cylindrical shank portion 115, a head 116 at one end of the smooth cylindrical shank portion 115 and a threaded portion 117 at an opposite end of the smooth cylindrical shank portion 115. In an embodiment, the head 116 is a countersunk head. In an embodiment, a locking member is adapted to be installed to the pin member 112 (not shown in the Figures). In an embodiment, the locking member is a threaded nut that engages the threaded portion 117 of the pin member 112. In another embodiment, the locking member is a collar adapted to be swaged into the lock grooves of the threaded portion 117 of the pin member 112.

In an embodiment, the pin member 112 is fully coated with a costing 119. In an embodiment; the coating 119 is a metallic coating. In an embodiment, the coating 119 is a soft, metallic coating. That is, the coating 119 is applied to the elongated shank portion 114, including the smooth cylindrical shank portion 115 and the threaded portion 117, and the head 116, including an underside (e.g., bearing surface 120) of the head 116. In an embodiment the coating 119 is copper. In another embodiment, the coating 119 is silver. In another embodiment, the coating 119 is gold, in other embodiments, the coating 119 is made from a material having a high electrical conductivity, for example, a material having an electrical conductivity higher than 20% IACS.

In other embodiments, the coating 119 can consist of any one of the coatings 22 with respect to the embodiment of the pin member 12, which are described in detail above.

In another embodiment, the pin member 112 is partially coated with the coating 119. In an embodiment, the coating 119 is applied to the head 116, including the underside 120 of the head 116, of the pin member 116. In another embodiment, the coating 119 is applied to the head 116 (including the underside 120 of the head 116) and to the smooth cylindrical shank portion 115 of the pin member 112. In another embodiment, the coating 119 is applied to the smooth cylindrical shank portion 115 of the pin member 112. In another embodiment, the coating 119 is applied to the smooth cylindrical shank portion 115 and the threaded portion 117 of the pin member 112.

In another embodiment, the pin member 112 does not include the coating 119.

Still referring to FIGS. 8, 9A and 9B, in an embodiment, a conforming seal element 118 is attached to the elongated shank portion 114 and juxtaposed with the bearing surface 120 of the head 116 of the pin member 112. In an embodiment, the seal element 118 is separate and distinct from the pin member 112. In an embodiment, the seal element 118 can be positioned within a hole of a structure and the pin member 112 can then be inserted into the seal element 118 during installation of the fastener 110. In an embodiment, the seal element 118 is frusto-conical in shape and includes a centrally located, circular-shaped aperture 122 that is sized and shaped to fit around the shank portion 114 of the pin member 112 and juxtaposed with the bearing surface 120 of the head 116 of the pin member 112. In an embodiment, the seal element 118 includes a sealing portion 121. In another embodiment, a lip 123 extends from one side of the sealing portion 121. In an embodiment, the lip 123 is angled upwardly from the sealing portion 121. In another embodiment, a tubular portion 125 extends axially from an opposite side of the sealing portion 121. In an embodiment, the seal element 118 is made from copper. In an embodiment, the sealing portion 121 of the seal element 118 has a thickness in a range of about 5 microns to about 100 microns.

It is noted that all solid surfaces of the pin member 112 and a structure 150 in which the fastener 110 is adapted to be installed are rough on a microscopic scale. Surface micro-roughness consist of peaks and troughs whose shape, variations lift height, average separation and other geometric characteristics depend on the details of the process used to generate the surfaces. Contact between two engineering bodies occurs at discrete microscopic spots that are the result of mechanical contact of asperities on the two surfaces. For ail solid materials, the area of true contact is a small fraction of the nominal contact area for a wide range of normal contact loads.

Figure 10:
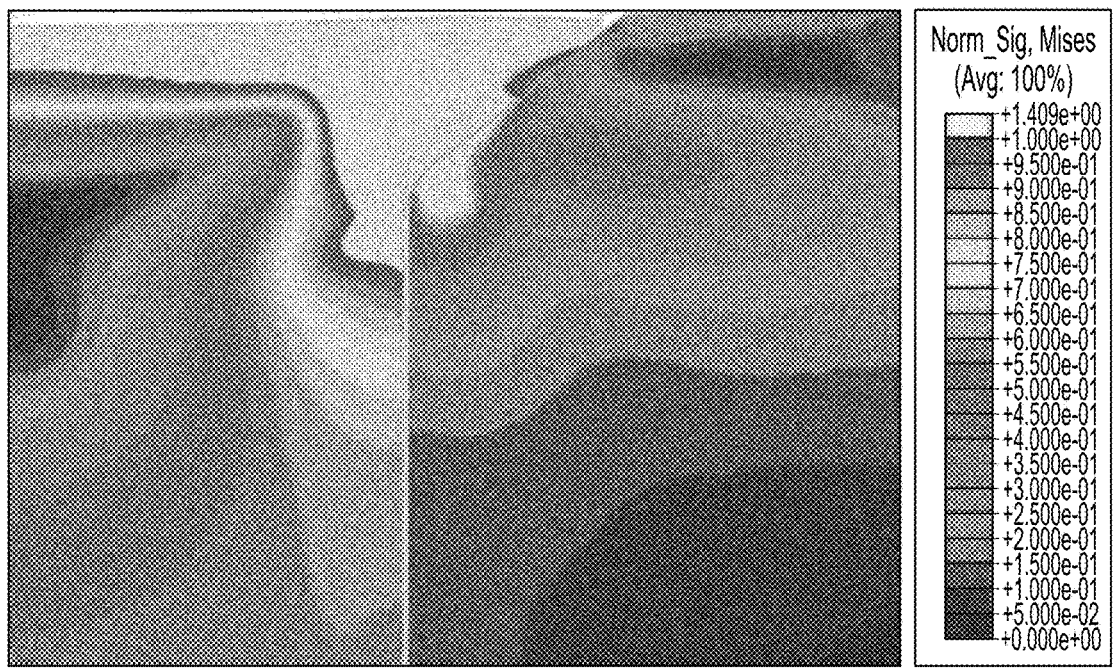
FIG. 10 illustrates a screenshot of a stress distribution analysis of an installed fastener.
Figure 11:
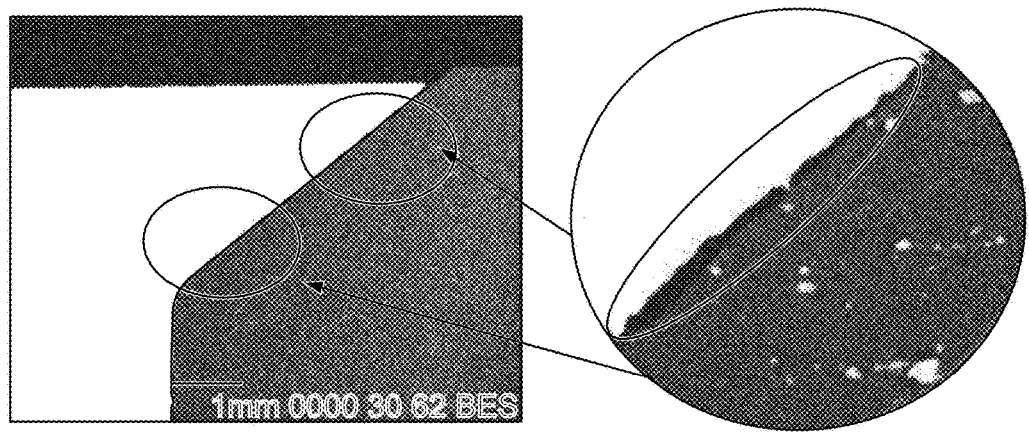
FIG. 11 is a micro-photograph of the cross-section of a standard fastener installed in a structure.

Referring to FIGS. 10 and 11, when mechanical load is exerted through this contact area, the mode of deformation of contact asperities is elastic, plastic, or a mixture of plastic and elastic depending on the local mechanical stresses, and on the properties of the material such as the elastic modulus and hardness. In a bulk electrical interface where the mating components are metals, the contacting surfaces often contain an oxide or other electrical insulating layers. Generally the interface becomes electrically conductive only when electrically insulation films are displaced at the asperities of the contacting surfaces or the potential across the interface exceeds the dielectric strength of the electrically insulation film. For the sake of simplicity in the field of electrical connectors, the discrete spots are often assumed to be circular. This assumption provides an acceptable geometric description of the average contact spots where the roughness topographies of the mating surfaces are isotropic. While this assumption is acceptable for metallic structures, it becomes invalid when the mating surfaces are characterized by directional micro-texture or are clearly anisotropic in nature. The true area of contact between a fastener and the surrounding CFRP structure is a very small percent of the nominal area due to the multi-layered construction and anisotropic nature of CFRP structures, which further complicates quality of the electrical contact between the fastener and surrounding CRFP structure.

Figure 12A:
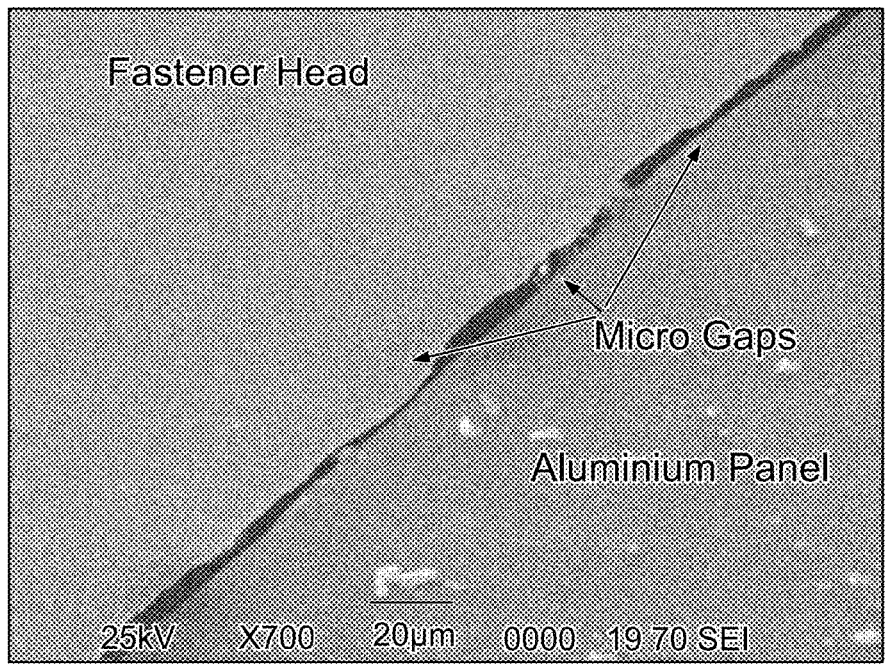
Figure 12B:
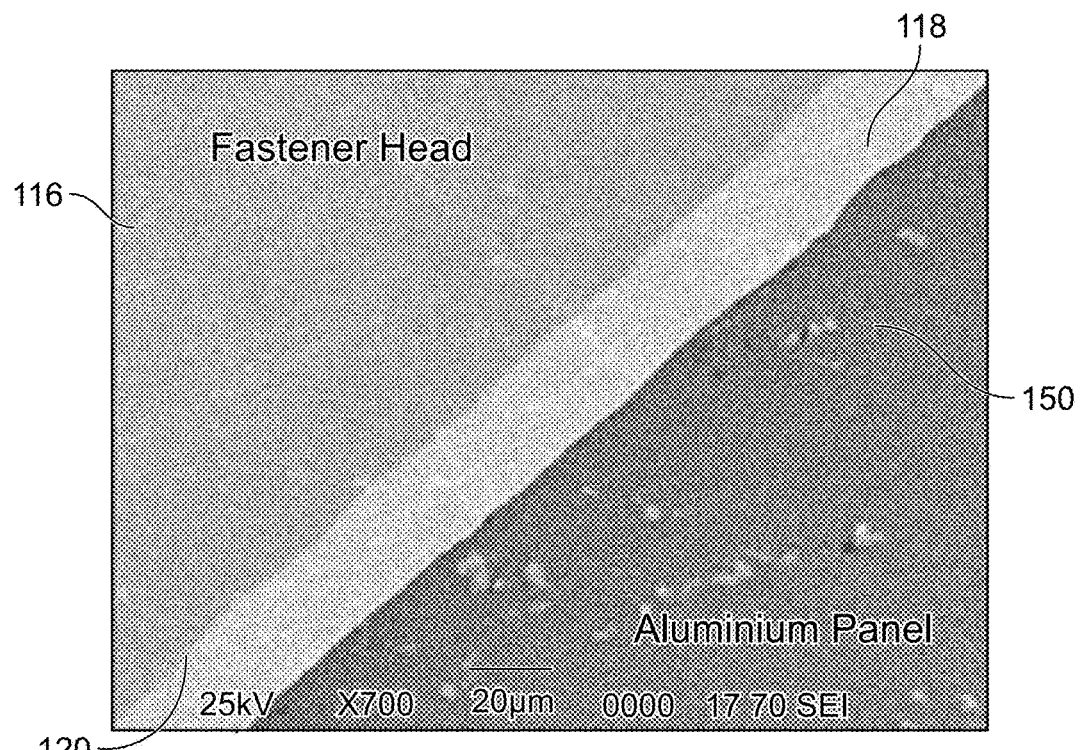
FIG. 12B is a micro-photograph that illustrates the pin member and the seal element shown in FIG. 8 installed in a structure.

FIG. 12A illustrates a standard fastener installed in a structure (e.g., an aluminum panel), which shows microgaps between the head of a pin member and the structure. In an embodiment, with reference to FIG. 12B, the conforming seal element 118 is adapted to maximize the true area of contact between the fastener (e.g., the bearing surface 120 of the head 116 of the pin member 112) and a structure 150 with minimum mechanical load. In an embodiment, the structure 150 includes a composite material, in another embodiment, the structure 150 is substantially made from a composite material, in another embodiment, the structure 150 is partially made from a composite material. In another embodiment, the structure 150 includes a metallic material. In an embodiment, the metallic material is aluminum. In another embodiment, the structure 150 is made substantially from a metallic material, in another embodiment, the structure 150 is made partially from a metallic material.

In an embodiment, the conforming seal element 118 includes a multi-layer construction with a relatively soft, yet highly electrically conductive base layer, which provides macroscopic conformity, and a softer top layer, which provides microscopic conformity.

Figure 13A:
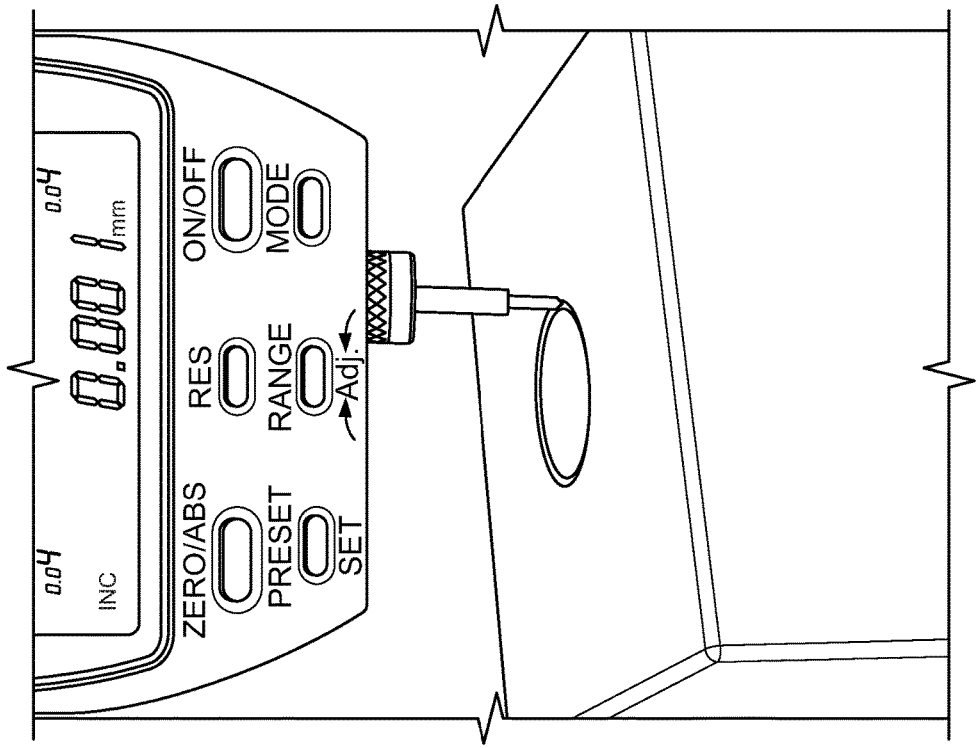
FIGS. 13A and 13B show pre-sanding and post-sanding steps of a structure containing a fastener of FIG. 8 installed therein.
Figure 13B:
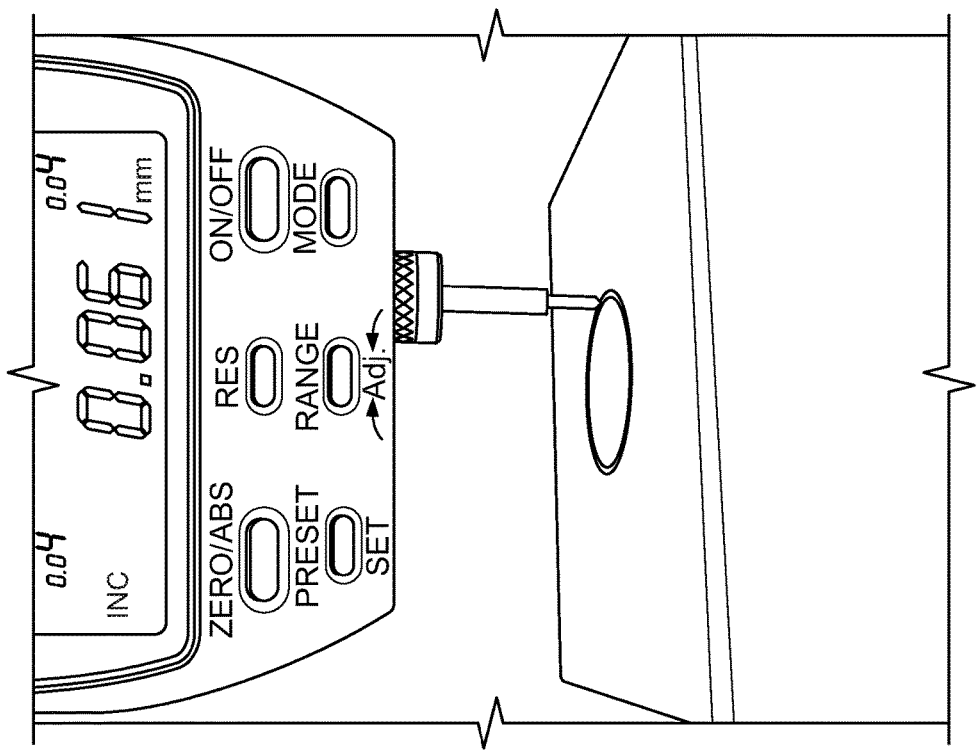
Figure 14A:
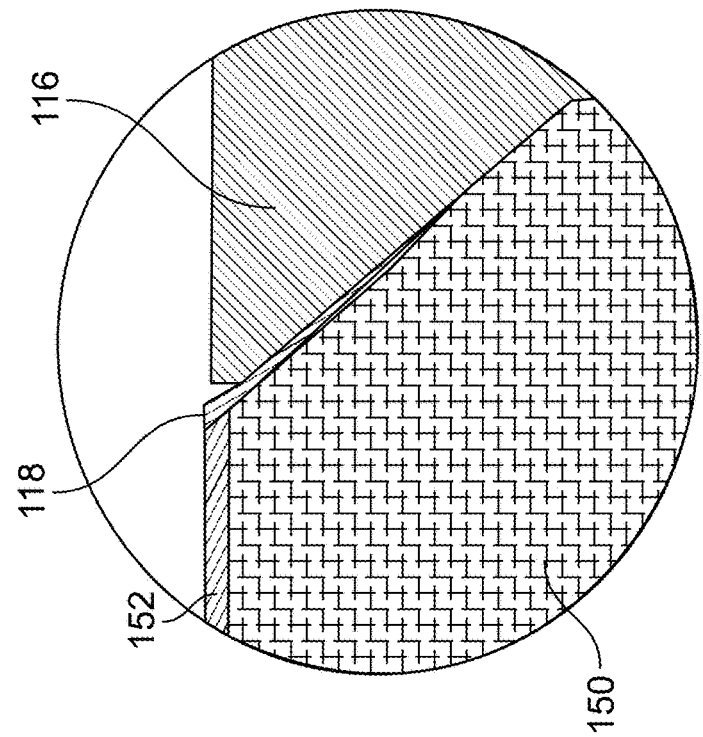
FIGS. 14A and 14B are schematic illustrations of the fastener of FIG. 8 before and after a sanding step, respectively.
Figure 14B:
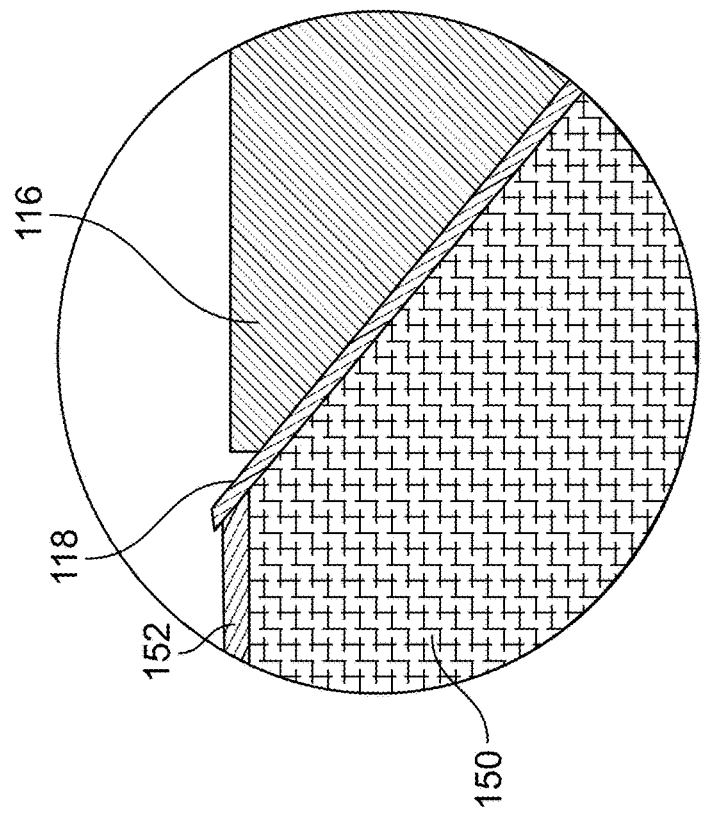

In an embodiment, a method by which the fastener 110 with the seal element is installed is described hereinbelow. In an embodiment, with reference to FIGS. 8, 9A, 9B, 13A, 13B, 14A and 14B, the method includes the steps of coating the pin member 112 with the coating 119 (either fully or partially as described above), attaching the seal element 118 to the fastener 110 (e.g., the pin member 112), and installing the fastener 110 in the structure 150. In an embodiment, the coating step is not included when the pin member 112 is not coated with the coating 119 as described above. In another embodiment, the seal element 118 can be positioned within a hole of the structure 150 and the pin member 112 can then be inserted into the seal element 118 during installation of the fastener 110. In an embodiment, with respect to the installation step, a preload to the fastener 110 is provided by the locking member (e.g., nut or collar), and a force is exerted on the structure 150 by the pin member 112 with the seal element 118 positioned between the head 116 of the pin member 112 and the structure 150. As the seal element 118 conforms to the inherent micro-roughness between the head 116 of the pin member 112 and the structure 150, a portion of the seal element 118 is extruded upward the edge of the pin member 112 and protrudes above the surface of the structure 150. With reference to FIGS. 13A, 14B, 14A and 14B, the seal element 118 is trimmed flush with the surface of the structure 150 by sanding the top of the seal element 118 (e.g., proximate to the tip 123) and, if necessary, the structure 150. In an embodiment, the sanding step is simultaneous with the preparation of the surface of the structure 150 for the application of paint 152.

Figure 15A:
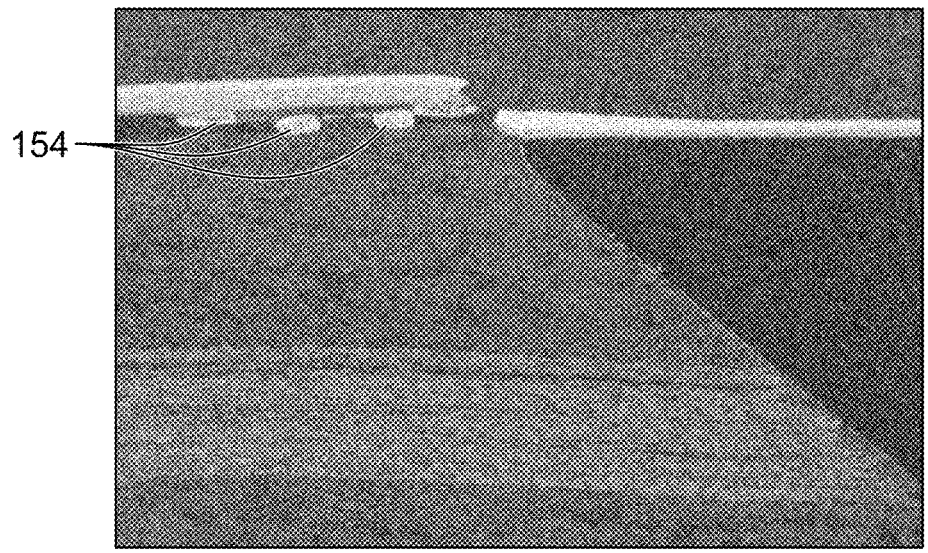
Figure 15B:
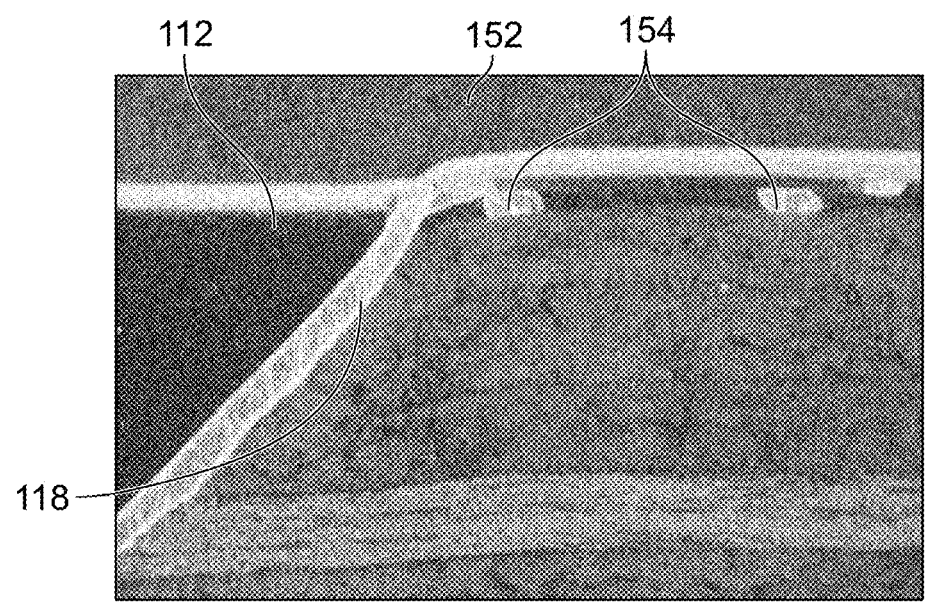
FIG. 15B is a micro-photograph of a fastener shown in FIG. 8 installed in a structure with an associated copper mesh.

FIGS. 15A and 15B are photographs illustrating the cross-sections of a pin member without the seal element 118 (FIG. 15A) and the pin member 112 with the seal element 118 (FIG. 15B). As shown, the inclusion of the seal element 118 is provided along with a copper mesh 154 and improves paint adhesion.

Figure 15C:
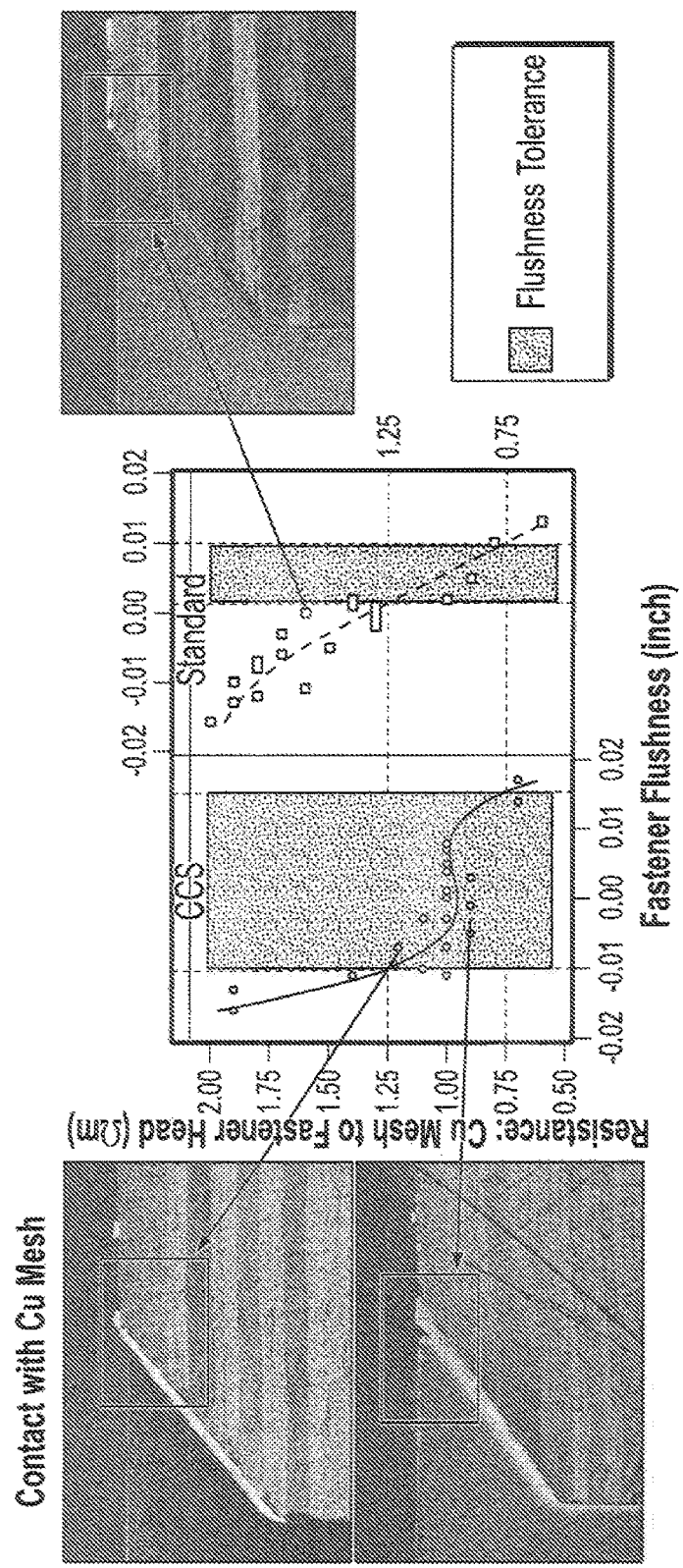
FIG. 15C is graph and associated photographs corresponding to specific data points on the graph showing flushness tolerance between the fastener shown in FIG. 8 and a standard fastener.

Referring to FIG. 15C, the fastener 110 improves a range of countersink within the structure 150 over which the connection with the copper mesh 152 is maintained. As seen on the graph shown in FIG. 20, the flushness tolerance of the fastener 110, shown on the left, is wider than a baseline fastener without the seal element, as shown on the right.

Figure 16A:
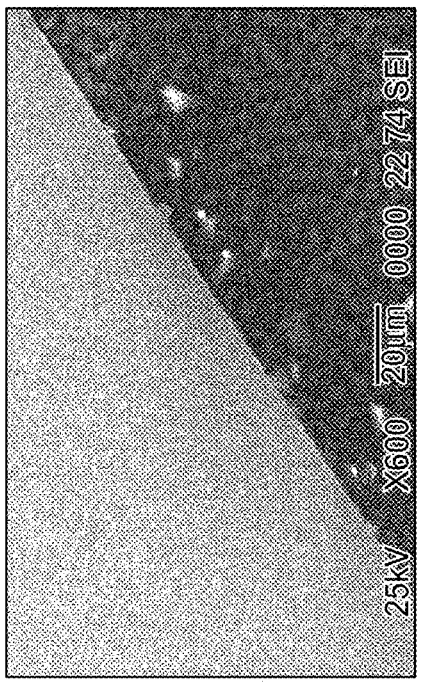
Figure 16B:
Figure 16C:
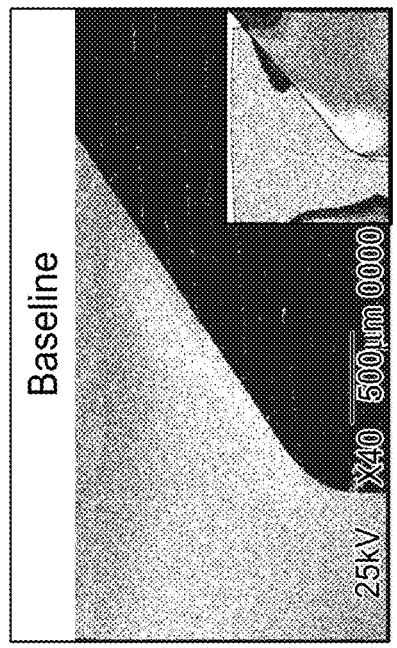
FIGS. 16C and 16D are micro-photographs of a fastener as shown in FIG. 8 installed in a structure (25 times and 1000 times magnification, respectively)
Figure 16D:
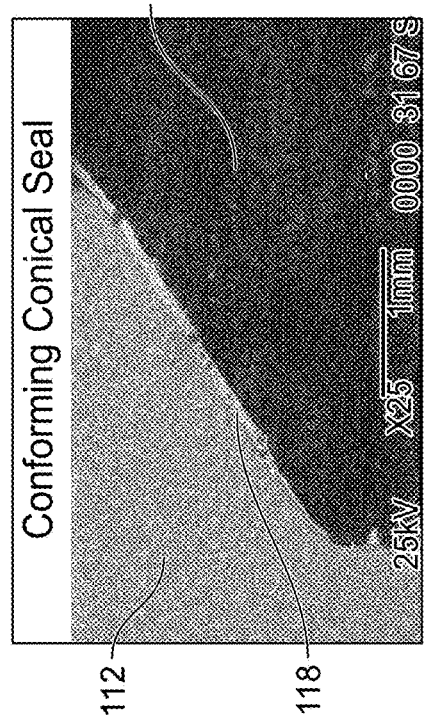
Figure 18A:
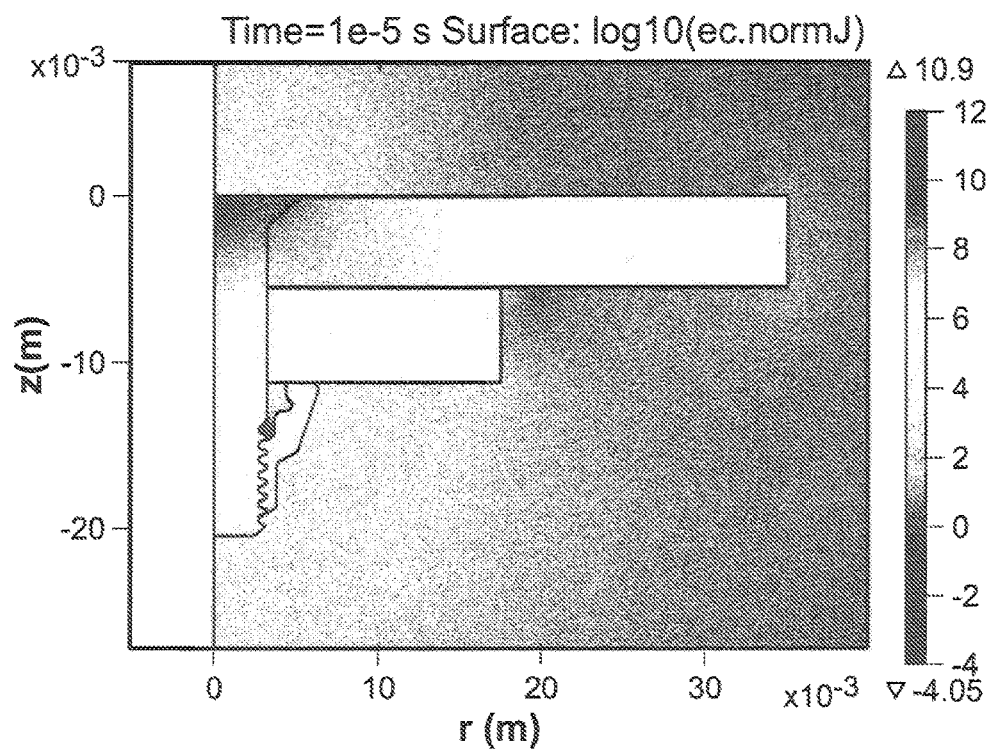
FIG. 18A through 18F illustrate a series of simulation results showing reduction of contact resistance and optimized electrical intimacy of the fastener of FIG. 8.
Figure 18B:
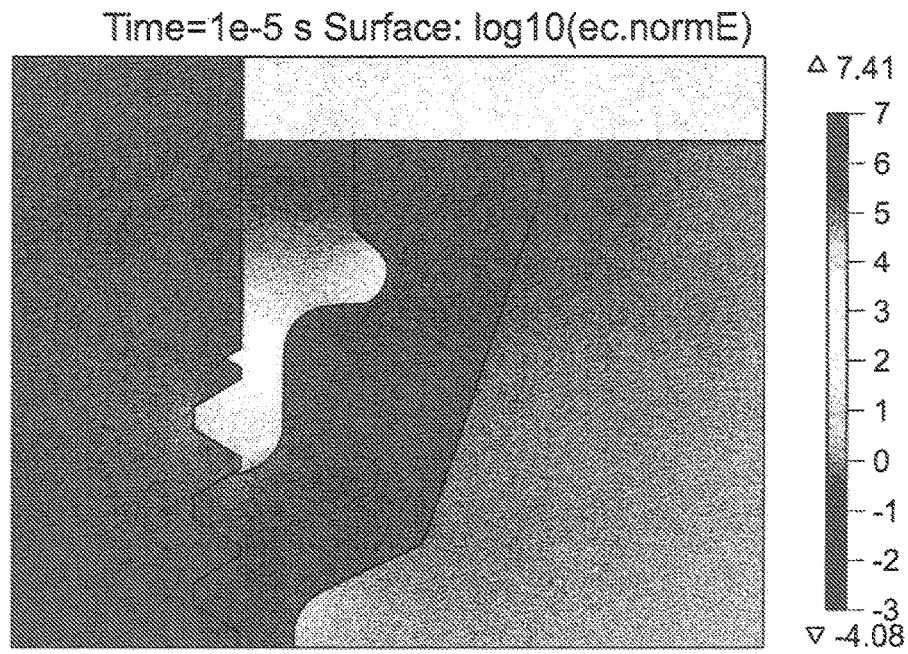
Figure 18C:
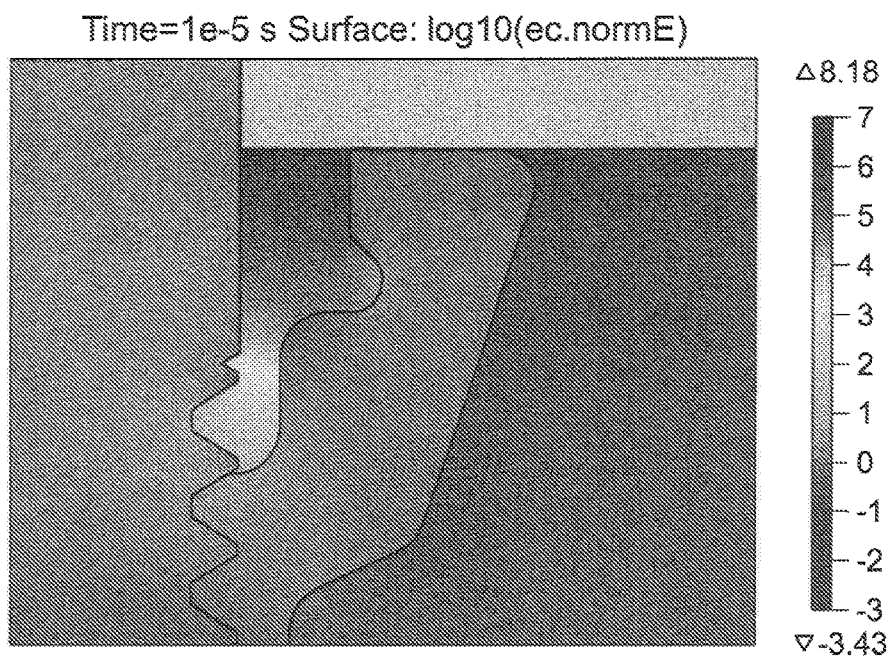
Figure 18D:
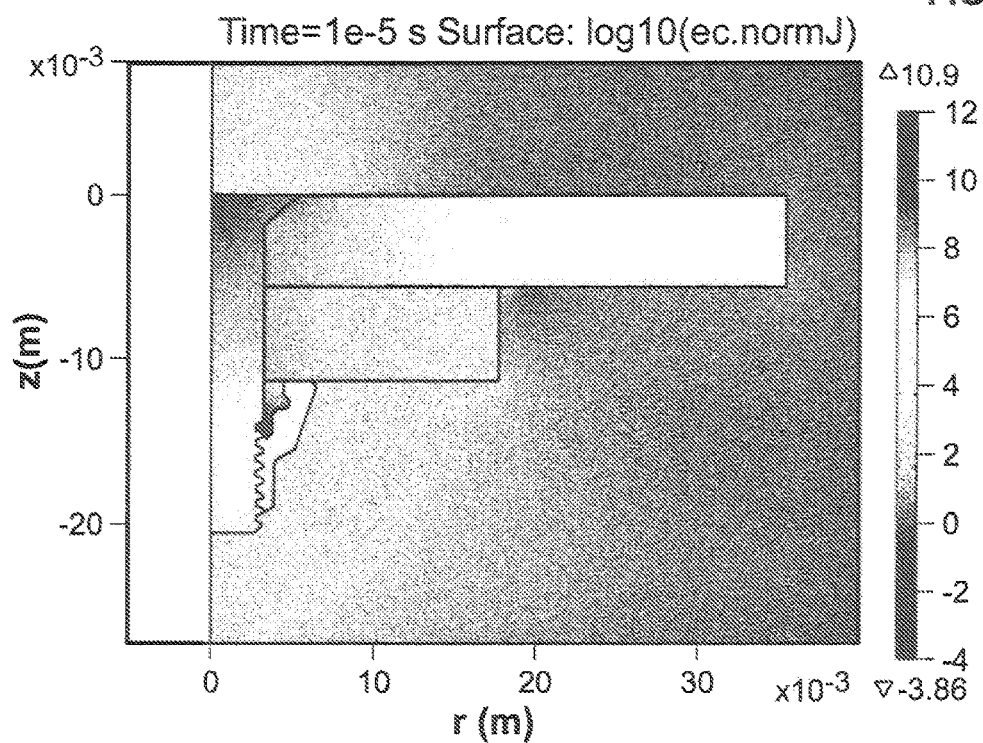
Figure 18E:
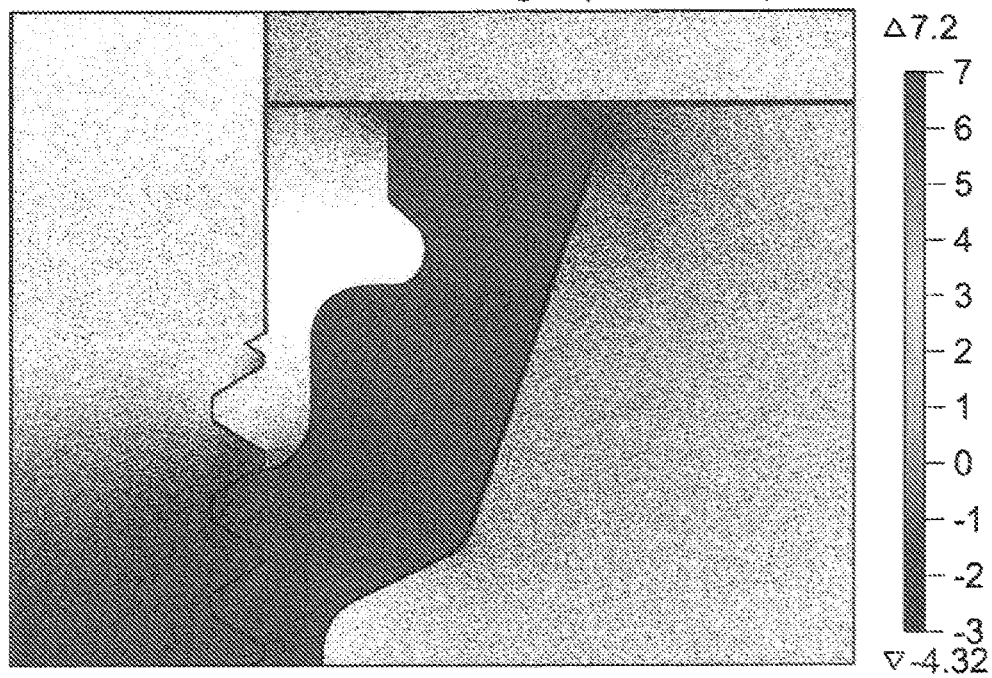
Figure 18F:
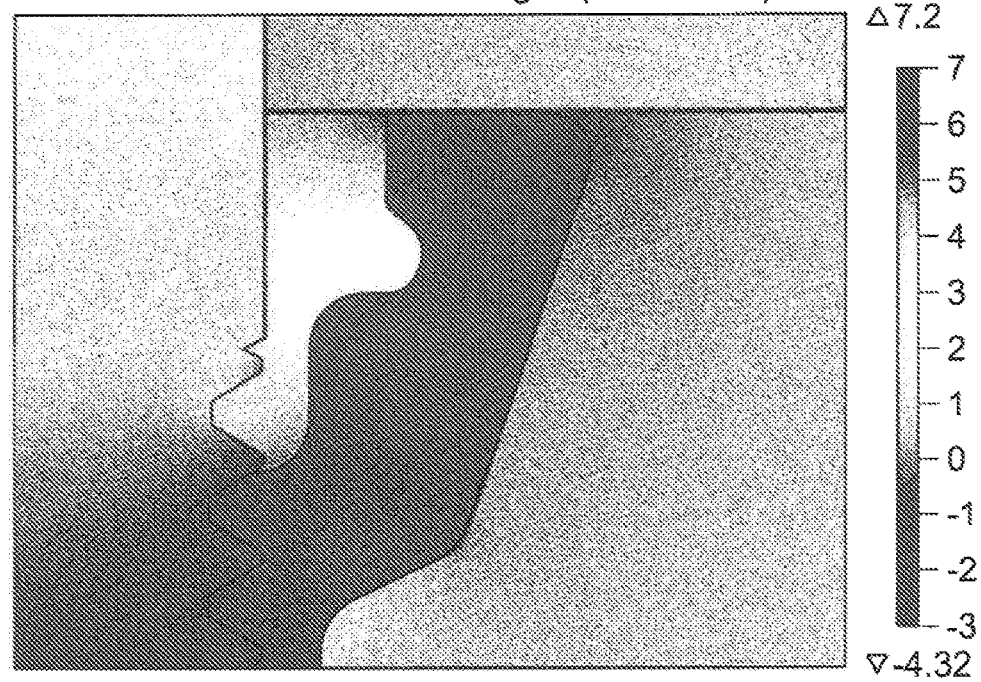

FIGS. 16A through 16D are photographs showing the difference in pin/CFRP interface between a conventional fastener without a seal element (FIGS. 16A and 16B) and a fastener with the seal element 18 (FIGS. 16C and 16D). Micro-level conformance between the seal element 118 and the CFRP structure 50 enhances the current transfer from fastener to the structure 150 and reduce arcing.

FIGS. 17A through 17D illustrate the differences in the effects of damage in aluminum panels of a fastener without the seal element 118 (FIGS. 17A and 17C) and a fastener with the seal element 118 (FIGS. 17B and 17D). The seal element 118 increases the electrical intimacy between the fastener 110 and the structure in the area adjacent to the seal element 118. As will be described in more detail below, this reduces the magnitude of the electric field near the locking member (e.g., nut or collar).

With reference to FIGS. 18A through 18F, which illustrate simulation results, the seal element 118 reduces contact resistance around the head 116 of the pin member 112 and results in optimized electrical intimacy. This nanoscale conformity leads to improved current transfer into the upper panel of the aircraft structure 150. During a lightning strike, the external discharge, which attaches to the head 116, will tend to attach to regions having larger electric fields. In the case of the fastener 110 having the seal element 118, the electric fields are much lower, resulting in so-called equipotential surfaces with a flatter field profile. This field flattening effect minimizes the amount of structural damage caused by large concentrated flows through sharp edges.

An advantage of the seal element 118 is the large reduction of the charge buildup between the fastener 110 and surrounding materials within the fastener assembly. The time dependent electric potential has a lower peak value, which results in a large reduction of the electric field magnitudes around the bearing surface of the nut region. Typically, large fields around the nut region and sharp edges can result in dielectric breakdown and edge glow phenomenon. The large reduction in electric fields is a direct result of the enhanced current transport.

Figure 19:
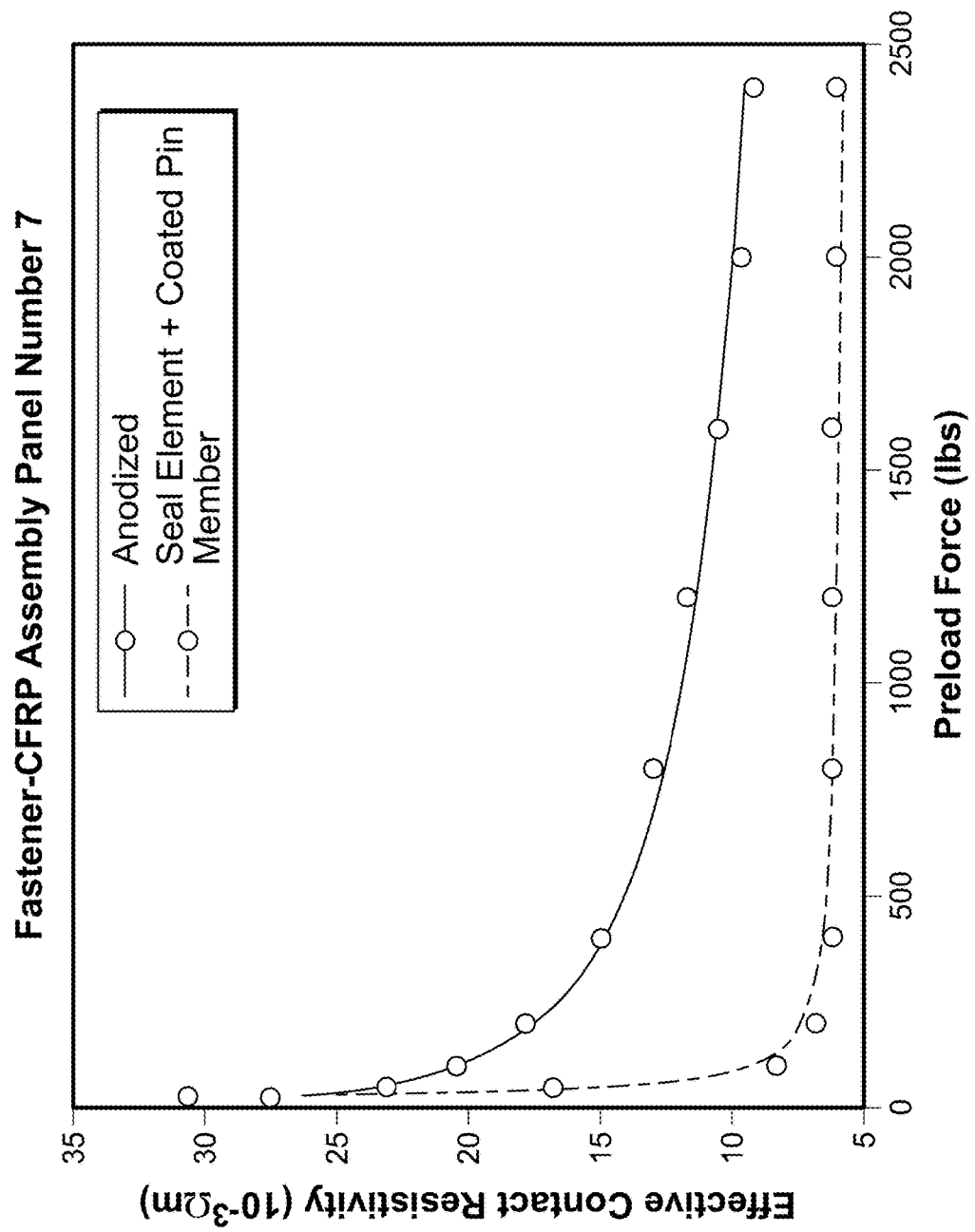
FIG. 19 is a graph showing electric contact resistivity versus preload force between the fastener shown m FIG. 8, a fastener with a coated pin member, and an anodized fastener.

Referring to FIG. 19, the fastener 110 includes a reduced contact resistance. Contact resistivity measurements show current transfer improvement with the fastener 110 having the coating 119 and the seal element 118 over baseline pin members without the coating 119 and the seal element 118.

It should be understood that the embodiments described herein are merely exemplary and that a person skilled in the art may make many variations and modifications without departing from the spirit and scope of the invention. All such variations and modifications are intended to be included within the scope of the claims.

What is claimed is:

1. A fastener, comprising:
 a pin member including an elongated shank having a first end, a second end opposite the first end, a cylindrical shank portion having an outer surface, a head located at the first end of the elongated shank, the head including a face and a bearing surface located on the underside of the head and opposite the face, and a threaded portion located at the second end of the elongated shank; and
 a seal element attached to the pin member and juxtaposed with the bearing surface of the head of the pin member, the seal element including a sealing portion having a first side, a second side opposite the first side, and a lip extending from the first side of the sealing portion and past the face of the head of the pin member.

2. The fastener of claim 1, wherein the seal element is made of copper.

3. The fastener of claim 1, wherein the lip extends angularly from the sealing portion.

4. The fastener of claim 3, wherein the seal element includes a tubular portion extending axially from the second side of the sealing portion.

5. The fastener of claim 4, wherein the seal element includes a thickness in a range of about 5 microns to about 100 microns.

6. The fastener of claim 1, wherein the pin member includes a coating.

7. The fastener of claim 6, wherein the coating is a metallic coating.

8. The fastener of claim 7, wherein the metallic coating is selected from the group consisting of gold, silver, and copper.

9. The fastener of claim 6, wherein the coating is made from a material having an electrical conductivity higher than 20% SACS.

10. The fastener of claim 6, wherein the head of the pin member is coated with the coating.

11. The fastener of claim 6, wherein the outer surface of the cylindrical shank portion of the pin member is coated with the coating.

12. The fastener of claim 11, wherein the head of the pin member is coated with the coating.

13. The fastener of claim 11, wherein the threaded portion of the pin member is coated with the coating.

14. The fastener of claim 6, wherein the pin member is fully coated with the coating.

15. In combination, a structure; and a fastener installed within the structure, the fastener including a pin member having an elongated shank with a first end, a second end opposite the first end, a cylindrical shank portion having an outer surface, a head located at the first end of the elongated shank, the head including a face and a bearing surface located on the underside of the head and opposite the face, and a threaded portion located at the second end of the elongated shank, and a seal element attached to the pin member and juxtaposed with the bearing surface of the head of the pin member, the seal element including a sealing portion having a first side, a second side opposite the first side, and a lip extending from the first side of the sealing portion and past the face of the head of the pin member.

16. The combination of claim 15, wherein the seal element is made of copper.

17. The combination of claim 15, wherein the lip extends angularly from the sealing portion.

18. The combination of claim 17, wherein the seal element includes a tubular portion extending axially from the second side of the sealing portion.

19. The combination of claim 18, wherein the seal element includes a thickness in a range of about 5 microns to about 100 microns.

20. The combination of claim 15, wherein the pin member includes a coating.

21. The combination of claim 20, wherein the coating is a metallic coating.

22. The combination of claim 21, wherein the metallic coating is selected from the group consisting of gold, silver, and copper.

23. The fastener of claim 20, wherein the coating is made from a material having an electrical conductivity higher than 20% IACS.

24. The combination of claim 20, wherein the head of the pin member is coated with the coating.

25. The combination of claim 20, wherein the outer surface of the cylindrical shank portion of the pin member is coated with the coating.

26. The combination of claim 25, wherein the head of the pin member is coated with the coating.

27. The combination of claim 25, wherein the threaded portion of the pin member is coated with the coating.

28. The combination of claim 20, wherein the pin member is fully coated with the coating.

29. The combination of claim 15, wherein the structure includes a composite material.

30. The combination of claim 29, wherein the structure is substantially made from the composite material.

31. The combination of claim 29, wherein the structure is partially made from the composite material.

32. The combination of claim 15, wherein the structure includes a metallic material.

33. The combination of claim 32, wherein the metallic material is aluminum.

34. The combination of claim 32, wherein the structure is made substantially from the metallic material.

35. The combination of claim 32, wherein the structure is made partially from the metallic material.

* * * * *